US008581781B2

(12) United States Patent
Slastion

(10) Patent No.: US 8,581,781 B2
(45) Date of Patent: Nov. 12, 2013

(54) INTERFEROMETRIC METHODS AND SYSTEMS

(76) Inventor: Vladimir Slastion, Toronto (CA)

( * ) Notice: Subject to any disclaimer, the term of this patent is extended or adjusted under 35 U.S.C. 154(b) by 344 days.

(21) Appl. No.: 13/029,810

(22) Filed: Feb. 17, 2011

(65) Prior Publication Data
US 2011/0205123 A1    Aug. 25, 2011

Related U.S. Application Data

(60) Provisional application No. 61/306,046, filed on Feb. 19, 2010.

(51) Int. Cl.
*G01S 3/46* (2006.01)
*G01S 3/48* (2006.01)

(52) U.S. Cl.
USPC .......................................... 342/424; 342/442

(58) Field of Classification Search
USPC .................................................. 342/424, 442
IPC .................................................. G01S 3/46,3/48
See application file for complete search history.

(56) References Cited

U.S. PATENT DOCUMENTS

| 5,099,248 | A | * | 3/1992 | Brommer | 342/424 |
|---|---|---|---|---|---|
| 5,592,181 | A | * | 1/1997 | Cai et al. | 342/442 |
| 6,140,963 | A | * | 10/2000 | Azzarelli et al. | 342/442 |
| 7,567,627 | B1 | * | 7/2009 | Fraundorfer et al. | 455/456.6 |
| 2004/0204098 | A1 | * | 10/2004 | Owen | 455/561 |

FOREIGN PATENT DOCUMENTS

RU    2029963 C1    2/1995

OTHER PUBLICATIONS

Malloy, Neil J., "Analysis and Synthesis of General Planar Interferometer Arrays", IEEE International Conference on Acoustics, Speech, and Signal Processing (ICASSP), Boston 1983, pp. 352-355.
Foy, Wade H., "Position-Location Solutions by Taylor-Series Estimation", IEEE Transactions on Aerospace and Electronic Systems, Mar. 1976, vol. AES-12, No. 2, pp. 187-194.
Ho, K.C. et al., "Solution and Performance Analysis of Geolocation by TDOA", IEEE Transactions on Aerospace and Electronic Systems, Oct. 1993, vol. 29, No. 4, pp. 1311-1322.
Co-pending U.S. Appl. No. 13/029,857 entitled "Extended Range Interferometric Methods and Systems", filed Feb. 17, 2011.

* cited by examiner

*Primary Examiner* — Jack W Keith
*Assistant Examiner* — Fred H Mull
(74) *Attorney, Agent, or Firm* — Bereskin & Parr LLP; Isis E. Caulder

(57) ABSTRACT

An interferometer estimates at least one interferometric parameter of one or more signals emitted from a source. The interferometer has an array of antennas and at least one phase detector configured to determine a plurality of phase measurements of the one or more source signals. A combined estimator processes the plurality of phase measurements to provide estimates of at least one sought parameter, representing the at least one interferometric parameter, and at least one noise parameter associated with the plurality of phase measurements. A postprocessor processes estimates of the at least one sought parameter based on at least one noise parameter received from the combined estimator to improve an estimate of the at least one interferometric parameter. The combined estimator is configurable to produce a maximum likelihood estimate of the at least one sought parameter using at least one noise parameter calculated based on the plurality of phase measurements.

31 Claims, 23 Drawing Sheets

INTERFEROMETRIC METHODS AND SYSTEMS

CROSS-REFERENCE TO RELATED APPLICATIONS

This application claims the benefit of U.S. Provisional Application Ser. No. 61/306,046 filed on Feb. 19, 2010, the entire contents of which are hereby incorporated by reference.

FIELD

Embodiments described herein relate generally to interferometric systems and methods and, more specifically, to the estimating of one or more interferometric parameters on the basis of multiple ambiguous phase measurements.

INTRODUCTION

Interferometric systems have various applications including but not limited to direction finding and range finding applications.

SUMMARY

Some embodiments described herein relate to a combined estimator. In some embodiments, the combined estimator is for use in an interferometric system. In some embodiments, the combined estimator comprises a processor. In some embodiments the combined estimators described herein can be implemented in hardware, in software running on microprocessor, ASIC, or in combination of hardware and software. In some such embodiments, the combined estimator estimates a plurality of parameters, which may be referred to as sought parameters, that can in turn be used to estimate overall interferometric parameters by, for example, the overall interferometric system. In some embodiments the combined estimator also estimates noise parameters that may be independent of the overall parameters being estimated by the interferometric system.

In some embodiments, the noise parameters are used to determine the quality of associated estimated parameters. In some embodiments, if the noise component is above a threshold then the associated estimated parameters are discarded and therefore are not used in the estimation of the overall parameters by an overall interferometric system.

Some embodiments described herein relate to an interferometer for determining an interferometric parameter. The interferometer is configured to: determine a plurality of phase measurement values; determine a noise parameter associated with phase measurement values; determine if the noise parameter is above a threshold; if the noise parameter is above the threshold, discard the associated estimated parameters' values; determine the interferometric parameter based on the non-discarded estimated parameters' values.

In some embodiments, the interferometric parameter is an angle of arrival of a signal.

In some embodiments, each phase measurement is a phase difference in signals received by one or more signal sensors. In some embodiments, the phase measurement is a phase difference in signals received at two signal sensors. In some embodiments, the phase difference is outputted by a phase detector coupled to receivers which are in turn coupled to the signal sensors.

In some embodiments, a noise parameter is determined, where the noise parameter is indicative of the level of noise. In some embodiments, the noise parameter is a noise component that is independent of the interferometric parameter.

In some embodiments, at least one sought parameter is determined. In some such embodiments, the interferometric parameters are determined from the sought parameters. In some embodiments, the noise parameter associated with sought parameters is determined. If the noise parameter is above a threshold then the associated sought parameters are discarded and are not used in the determination of the interferometric parameters.

Some embodiments described herein relate to a method of determining interferometric parameters, the method comprises: determining a plurality of phase measurement values; determining a noise parameter associated with phase measurement values; determining if the noise parameter value is above a threshold; if the noise parameter value is above the threshold, discarding the associated phase measurement values; and determining the interferometric parameters based on the non-discarded phase measurement values.

BRIEF DESCRIPTION OF THE DRAWINGS

For a better understanding of the embodiments described herein and to show more clearly how they may be carried into effect, reference will now be made, by way of example only, to the accompanying drawings which show at least one example embodiment, and in which.

DETAILED DESCRIPTION OF EMBODIMENTS

Figure 1:
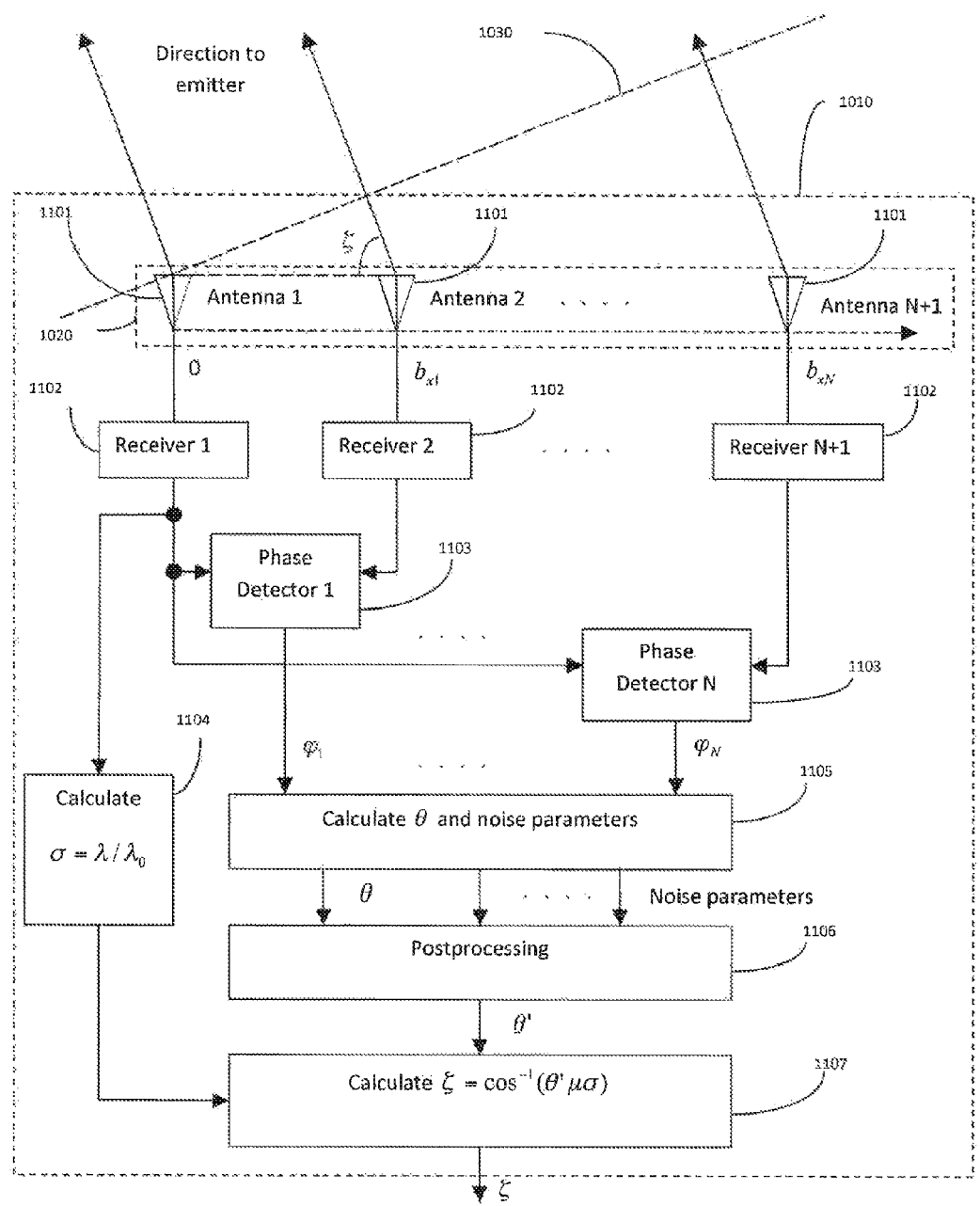
FIG. 1 illustrates a schematic diagram of various embodiments of a direction finding interferometer that estimates an angle of arrival.

Various apparatuses or methods will be described below to provide an example of an embodiment of each claimed invention. No embodiment described below limits any claimed invention and any claimed invention may cover systems, apparatuses, or methods that are not described below. The claimed inventions are not limited to systems, apparatuses, or methods having all of the features of any one apparatus or method described below or to features common to multiple or all of the system, apparatuses, or methods described below. It is possible that a system, apparatus, or method described below is not an embodiment of any claimed invention. The applicant, inventor and owners reserve all rights in any invention disclosed in a system, apparatus, or method described below that is not claimed in this document and do not abandon, disclaim or dedicate to the public any such invention by its disclosure in this document.

The embodiments described herein generally relate to interferometric systems and methods. Various embodiments described herein can be applied to various types of radars, positioning and navigation systems. Some of the embodiments described herein can be used to process ambiguous phase measurements in order to produce an estimation of an Angle of Arrival, Time of Arrival, Time Difference of Arrival, or Range.

Various interferometric systems are known in the art. Direction finding interferometers can include linear, planar, or three-dimensional antenna arrays to estimate one, two, or three Angles of Arrival. Phase interferometers, that estimate Angles of Arrival (AOA), can comprise several receiving antennas wherein the distances between the different receiving antennas in the phase interferometer are known. The lines between phase centers of antennas in direction finding interferometers can be referred to as baselines. Phase differences are generally measured between signals received on those baselines to compute AOA. The greater the distance between antennas, the more accurate estimation of AOA tends to be possible. However, a problem can arise when a baseline length is greater than half of a wavelength of an incident signal. In that case, the phase differences on some of the baselines can be much more than 360°. However, it is measurable only within a 360° range. Consequently, integer numbers of whole cycles of phase differences can be missed in the measurements. Those integers should be restored in order to provide an unambiguous AOA estimation, and multiple baselines are often used for this ambiguity resolution.

Ambiguity resolution in interferometric systems can be incorrect if the noise level in the phase measurements is above a given level or threshold. This limit can vary depending on the particular interferometer configuration. In various embodiments, the critical noise level threshold can be chosen. If the noise is over that threshold, then the probability of incorrect ambiguity resolution for the corresponding measurement is high. This in turn can mean that the result of the measurements is unreliable. Accordingly, in various embodiments, measurements that have a corresponding amount of noise that is above the threshold level of noise are rejected to improve the accuracy of the overall estimates. In addition, in various embodiments, the level of noise characterizes the quality of the estimates of the sought parameters. In some embodiments described herein, noise parameters and estimates of the sought parameters are computed concurrently. In some embodiments, the noise parameters are analyzed in order to estimate the phase noise level and thereby to determine the reliability of the estimates of the sought parameters. In some such embodiments, if specific estimates or samples of sought parameters are determined to be unreliable, then they are discarded. In various embodiments, discarding the unreliable samples of the sought parameters can improve the overall accuracy of the interferometer.

Various embodiments described herein relate to interferometric systems that estimate one or more sought parameters $\theta_1, \theta_2, \ldots, \theta_M$, and one or more noise parameters after processing phase measurements $\phi_1, \phi_2, \ldots, \phi_N$ on N measuring scales, where N>M. In some embodiments, the one or more sought parameters $\theta_1, \theta_2, \ldots, \theta_M$ can relate to, but are not limited to, one or more angles of arrival of a signal, the distance, the time of arrival of a signal, the time difference of arrival of signals. In some embodiments, the noise parameters are independent of the sought parameters that are estimated by the interferometric system. For example, for some interferometers that measure angle of arrival and that are made in accordance with the embodiments disclosed herein, the noise parameters are independent of the angle of arrival.

Reference is now made to FIG. 1, which illustrates a schematic diagram of various embodiments of a direction finding interferometer 1010 that estimates an angle of arrival of a signal. It should be understood that FIG. 1, as with other figures described herein, is an example of various embodiments and is not intended to be limiting in anyway. For example, although FIG. 1 illustrates embodiments in which antennas are utilized, various other embodiments can utilize other types or configurations of signal sensors. In general, any appropriate signal sensor can be used, including, but not limited to, an antenna, a light detector, and an ultrasonic transducer. In addition, any appropriate number of signal sensors can be utilized. In particular, in some embodiments, a single sensor can be utilized. In some other embodiments, such as those illustrated in FIG. 1, a plurality of signal sensors, for example an array of signal sensors, are utilized in the direction finding interferometer 1010. The number of signal sensors utilized can vary depending on various factors including, but not limited to, the particular application for which the embodiments is utilized. In addition, some embodiments of the interferometers disclosed herein may also comprise a signal source, such as for example, but not limited to, a RF antenna, a source of light, including but not limited to visible light and a laser, a source of electromagnetic radiation, an ultrasonic transducer, or any other appropriate radiation source. In some other embodiments, a signal source is not included. In some embodiments, the signal emitter can be part of a separate system.

In various embodiments, direction finding interferometer 1010 comprises a linear antenna array 1020 having N+1 antennas. A signal emitted from a remote source (not illustrated) is received by antennas 1101 and is processed as will be explained in greater detail below. The line between the phase center of one of the antennas 1101 in antenna array 1020 and the phase center of another antenna 1101 in antenna array 1020 maybe referred to as a baseline. FIG. 1 illustrates N such baselines organized in the way when one of the antennas in antenna array 1020 (e.g. antenna 1) is the reference antenna for every baseline in this array.

As is known to those skilled in the art, in two dimensions, a signal emitted by a source can be represented as a circular wave front centered on the emitter. For large distances away from the emitter, the circular wave front will be large and therefore its curvature will be gradual. Thus, for large distances from the emitter and for relatively short segments of the wave front, the wave front may be represented as a straight line. Accordingly, FIG. 1 illustrates wave front 1030 as a straight line as it approaches antenna array 1020. Depending on the location of the signal source, the wave front 1030 can arrive at the individual antennas 1101 at different times. This difference in arrival times manifests itself in a difference in phase of the signal received at each antenna 1101.

After the signals have been received by the antennas 1101, the signals pass through receivers 1102 and then on to phase detectors 1103. The phase detectors 1103 measure the phase differences $\phi_i$, $1 <= i <= N$ between signals received on antennas 1101 that are separated by the each of the interferometer baseline lengths $b_{xi}$. The measured phase difference $\phi_i$ depends on the Angle of Arrival $\zeta$ and wavelength $\lambda$ of the input signal, according to the following relationships:

$$\varphi_i + k_i = \frac{b_{xi}}{\lambda} \cos\zeta + n_i \quad (1)$$

$$\varphi_i = \varphi_{0i} + n_i \quad (2)$$

Where $n_i$ is a phase error; $\phi_{0i}$ is a phase difference that would be measured if $n_i = 0$. In various embodiments, phase detectors 1103 can measure phase differences within the limits: $-\pi \leq \phi_i < \pi$, or in normalized values $-0.5 \leq \phi_i < 0.5$. It may be assumed herein throughout that phase difference values are normalized. Consequently, integer multiples of $k_i$ full cycles of $\phi_i$ can be lost in the phase difference measurements by phase detectors 1103, if the phase difference of the signal received at each antenna 1101 falls outside the measurable range. In various embodiments, as explained in greater detail below, the integer multiples $k_i$ of full cycles of $\phi_i$ are recovered in order to calculate $\zeta$.

In various embodiments, the baseline lengths can be selected according to:

$$\frac{b_{xi}}{\lambda} = \frac{a_i}{\mu} \quad (3)$$

Where all $a_i$ are relatively prime numbers, and $\mu$ is a normalizing factor. In some embodiments, this restriction on baseline sizes can result in a high throughput interferometer that accurately and effectively estimates the angle of arrival $\zeta$. Based on equation (3), equation (1) can be written as:

$$\varphi + k = a \frac{\cos\zeta}{\mu} + n \quad (4)$$

Where $\phi$, $k$, $a$, and $n$ are N-dimensional vectors, with every $i^{th}$ element corresponding to the $i^{th}$ baseline.

Baseline sizes can be chosen to satisfy the condition specified in equation (3) for a particular wavelength $\lambda_0$. However, the received signal can have a different wavelength $\lambda$ which may be related to wavelength $\lambda_0$ by the following equation:

$$\lambda = \sigma \lambda_0 \quad (5)$$

Equation (4) can be written as:

$$\phi + k = a\theta + n \quad (6)$$

Where $$\theta = \frac{\cos\zeta}{\sigma\mu} \quad (7)$$

Where $\theta$ is a sought parameter, and $\zeta$ is an interferometric parameter.

If vector $n$ is a Gaussian random vector with covariance matrix B, then the maximum likelihood estimate of $\theta$ is the estimate that maximizes the likelihood function:

$$W(\theta, k | \varphi) = T * \exp\left(-\frac{1}{2}(\varphi + k - a\theta)^T B^{-1}(\varphi + k - a\theta)\right) \quad (8)$$

Where T is a multiplier that depends on covariance matrix B.

The embodiments described herein include methods and apparatus for the estimation of $\theta$ and noise parameters. In various embodiments, combined estimator 1105 estimates $\theta$ and noise parameters. In various embodiments, the noise parameters characterize the quality of $\theta$ and can be used to improve the quality of $\theta'$ in postprocessor 1106. In various embodiments, wavelength estimator 1104 estimates $\lambda$ and calculates $\sigma$ according to (5). The Angle of Arrival $\zeta$ is calculated from $\theta'$ in AOA estimator 1107 according to:

$$\zeta = \cos^{-1}(\theta'\sigma\mu) \quad (9)$$

Figure 2:
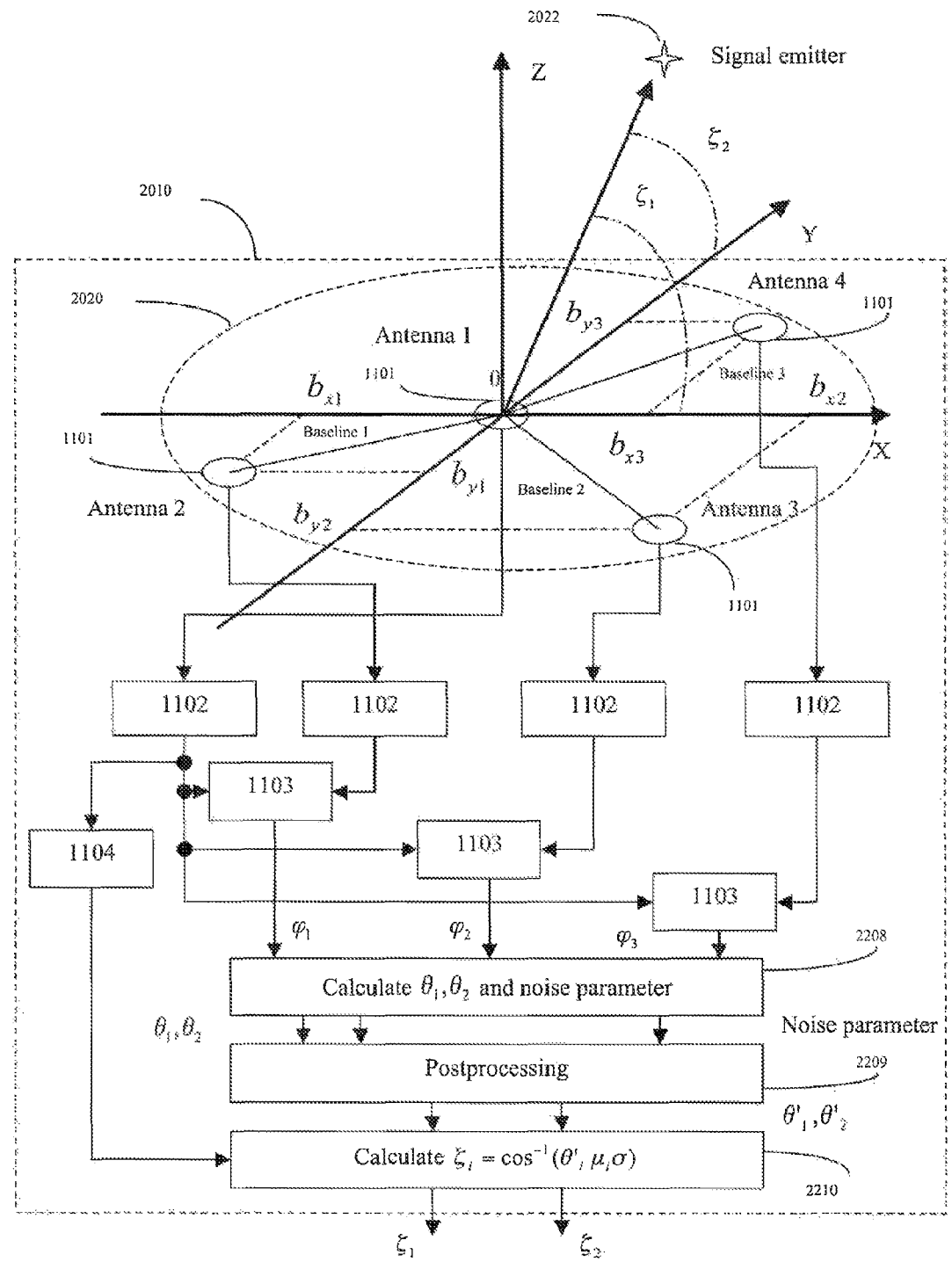
FIG. 2 illustrates a schematic diagram of various embodiments of a direction finding interferometer that estimates two angles of arrival.

FIG. 2 illustrates a schematic diagram of various embodiments of a direction finding interferometer 2010 that estimates two Angles of Arrival. In some embodiments, direction finding interferometer 2010 comprises 4 antennas 1101 arranged in a planar antenna array 2020. However, it should be understood that this is an example only and that other embodiments can have different number of antennas in the planar antenna array 2020. In addition, as mentioned above, other embodiments may utilize other types of signal sensors. Furthermore, other embodiments can be configured to estimate more than two angles of arrival. For example, in some embodiments, the signal sensors may be arranged in three dimensions instead of the planar antenna array 2020 shown in FIG. 2. Such embodiments can be used to measure 3 angles of arrival. The third angle can be redundant; however, in some embodiments, the third angle can be used to improve the accuracy of, for example, an estimate of the location of the target.

A signal emitted from a remote emitter, such as signal emitter 2022, is received by antennas 1101 and is processed as will be explained in greater detail below. It should be understood that the term signal emitter as used herein does not necessarily imply that the signal emitter comprises a signal source. In some embodiments, a separate signal source is used to project a signal onto the signal emitter, such that the signal emitter reflects the signal from the signal source. Accordingly, in such embodiments, the signal emitter emits a signal in the sense that it reflects a signal. In some embodiments, the signal source is a naturally occurring signal source. In some embodiments, the signal source is part of the interferometric system. In various other embodiments, the signal emitter comprises a signal source.

As explained above, the line between the phase center of one of the antennas 1101 in antenna array 2020 and the phase center of another antenna 1101 in antenna array 2020 can be referred to as a baseline. FIG. 2 illustrates an antenna array with 3 baselines where one antenna (e.g., antenna 1) is the reference antenna for every baseline. The baselines of direction finding interferometer 2010 are allocated on a plane and therefore, each plane baseline can be represented with two linear components $b_{xi}$ and $b_{yi}$. For embodiments such as those illustrated in FIG. 2, equation (1) can be rewritten in vector form as:

$$\varphi + k = \frac{1}{\lambda}\left(\begin{pmatrix} b_{x1} \\ b_{x2} \\ b_{x3} \end{pmatrix}\cos\zeta_1 + \begin{pmatrix} b_{y1} \\ b_{y2} \\ b_{y3} \end{pmatrix}\cos\zeta_2\right) + n \quad (10)$$

Considering equation (3) for both $b_{xi}$ and $b_{yi}$, equation (10) can be written as:

$$\varphi + k = \left(\begin{pmatrix} a_{11} \\ a_{21} \\ a_{31} \end{pmatrix}\frac{\cos\zeta_1}{\mu_1\sigma} + \begin{pmatrix} a_{12} \\ a_{22} \\ a_{32} \end{pmatrix}\frac{\cos\zeta_2}{\mu_2\sigma}\right) + n \quad (11)$$

Where $\varphi$, $k$, $a$, and $n$ are 3-dimensional vectors, with every $i^{th}$ element corresponding to the $i^{th}$ baseline. Equation (11) can be written as:

$$\varphi + k = A\Theta + n \quad (12)$$

Where $\Theta$ is a two-dimensional column vector of sought parameters with $$\theta_i = \frac{\cos\zeta_i}{\sigma\mu_i} \quad (13)$$

Where every $\zeta_i$ is a corresponding interferometric parameter.

A is a matrix with dimensions of 3×2. Column vectors $a_1$ and $a_2$ are 3-dimensional linearly independent vectors of relatively prime numbers. The maximum likelihood function, expressed above in equation (8), can be written as:

$$W(\Theta, k \mid \varphi) = T * \exp\left(-\frac{1}{2}(\varphi + k - A\Theta)^T B^{-1}(\varphi + k - A\Theta)\right) \quad (14)$$

In various embodiments, combined estimator 2208 calculates the value of $\Theta$, that maximizes equation (14). One noise parameter is calculated by the embodiments of the direction finding interferometer 2010 that are illustrated in FIG. 2. This noise parameter characterizes the quality of $\theta_1$ and $\theta_2$ and, in some embodiments, is used to improve the quality of $\theta'_1$ and $\theta'_2$ in postprocessor 2209. Angles of Arrival $\zeta_1$ and $\zeta_2$ are calculated in AOA estimator 2210.

Generally, in various embodiments, the direction finding interferometer 2010 can be designed to measure more than two parameters. For example, which is not intended to be limiting, a direction finding interferometer with a 3-dimensional antenna array can measure three Angles of Arrival specified between the line extending from the reference antenna to signal emitter and each of the coordinate axes X, Y, Z.

Equations (12), (13), and (14) are also valid for embodiments that have interferometers that measure M parameters $\theta_1, \theta_2, \ldots, \theta_m$, and one or more noise parameters after processing phase measurements $\phi_1, \phi_2, \ldots, \phi_n$ on N measuring scales, where N>M. Matrix A is a matrix of dimensions N×M, composed of column vectors $a_i$ which are N-dimensional linearly independent vectors of relatively prime numbers.

For fixed, k, the quadratic form in equation (14) is minimized if:

$$\Theta = (A^T B^{-1} A)^{-1} A^T B^{-1}(\varphi + k) \quad (15)$$

The vector k can be found by minimizing the following quadratic form:

$$k = \underset{k}{\operatorname{argmin}}((\varphi + k)^T C(\varphi + k)), \quad (16)$$

Where $$C = B^{-1} - B^{-1} A (A^T B^{-1} A)^{-1} A^T B^{-1} \quad (17)$$

Each of the described interferometers has a specific set of vectors k which shall be considered in equation (16). From this set, N–M linearly independent vectors $k_1, \ldots, k_{N-M}$ can be chosen in the way that they provide N–M lowest values of $$d_i = k_i^T C k_i \quad (18)$$

Those vectors can be combined in matrix K, which has dimensions N×(N–M).

$$K = (k_1, k_2, \ldots, k_{N-M}) \quad (19)$$

Characteristic matrix S with dimensions N×N can be obtained by combining matrices K and A as follows:

$$S = (K \vdots A) \quad (20)$$

Matrix S is used in various embodiments of the methods described herein in the effective estimation of $\Theta$ and noise parameters. Matrix S has a property that $\det(S) = \pm 1$. Equation (15) can be rewritten as:

$$\Theta = (A^T B^{-1} A)^{-1} A^T B^{-1} S S^{-1}(\varphi + k), \quad (21)$$

or equivalently:

$$\Theta = H S^{-1}(\varphi + k), \quad (22)$$

Where, $$H = (A^T B^{-1} A)^{-1} A^T B^{-1} S \quad (23)$$

In turn, matrix $S^{-1}$ can be partitioned in two matrices:

$$S^{-1} = \begin{pmatrix} U \\ \cdots \\ V \end{pmatrix} \quad (24)$$

Where U is a matrix comprised of the first (N–M) row vectors of $S^{-1}$:

$$U = \begin{pmatrix} S_1^{-1} \\ S_2^{-1} \\ \vdots \\ S_{N-M}^{-1} \end{pmatrix}. \quad (25)$$

Likewise V is a matrix comprised of the last M row vectors of $S^{-1}$:

$$V = \begin{pmatrix} S_{N-M+1}^{-1} \\ \vdots \\ S_N^{-1} \end{pmatrix}. \quad (26)$$

Accordingly, $S^{-1}\phi$ can be partitioned into two vectors:

$$\delta = U\phi, \quad (27)$$

$$\psi = V\phi. \quad (28)$$

Any N-dimensional vector k in equation (21) can be represented as a linear combination of the column-vectors from matrix S according to:

$$k = e_1 k_1 + e_2 k_2 + \ldots + e_{(N-M)} k_{(N-M)} + e_{(N-M+1)} a_1 + \ldots + e_N a_M \quad (29)$$

Where each of the $e_i$ in equation (29) are integers. Also, as will be appreciated:

$$S^{-1}S = SS^{-1} = I \quad (30)$$

Taking into consideration equations (20), (22), (28), (29) and (30), the part of equation (22) can be written as:

$$V(\varphi + k) = \psi + \begin{pmatrix} e_{(N-M+1)} \\ \vdots \\ e_N \end{pmatrix} \quad (31)$$

Matrix H can be partitioned in two matrices:

$$H = (R \vdots I) \quad (32)$$

Where R is a M×(N−M)—dimensional matrix of real numbers, and I is the M×M-dimensional identity matrix.

If there are no phase errors in the measurements (n=0), conducted by the direction finding interferometer 2010, or alternatively if phase errors are small, and k is a vector that minimizes the quadratic form in equation (16), it can be assumed that:

$$S^{-1}(\varphi + k) = \begin{pmatrix} O \\ V(\varphi + k) \end{pmatrix} \quad (33)$$

Where O is the (N−M)-dimensional zero vector. According to equations (22), (31), (32), and (33):

$$\Theta = \psi + \begin{pmatrix} e_{(N-M+1)} \\ \vdots \\ e_N \end{pmatrix} \quad (34)$$

The elements of Θ are normalized as shown in equation (13), and bounded by the limits: $-0.5 \leq \Theta_i < 0.5$. Thus, $e_j$ in equation (34) can be eliminated and equation (34) can be rewritten as:

$$\Theta = \psi - \text{rnd}[\psi], \quad (35)$$

where rnd[ ... ] is a procedure of rounding to the nearest integer every element of a vector inside of the square brackets [ ... ]. Equation (35) can also be rewritten as:

$$\Theta = \text{rrni}\{\psi\}, \quad (36)$$

Where rrni{ ... } is a procedure of calculating the residual of rounding to the nearest integer every element of a vector inside of the braces { ... }.

The accuracy of Θ calculated according to equation (36) can be very sensitive to the level of phase errors. Accordingly, in various embodiments, the level of phase errors, or the noise parameters, which are related to the level of phase errors, are utilized as "quality parameters" or parameters that characterize the quality of Θ. In various embodiments, noise parameters are estimated through the use of matrix U. Equations (20), (25) and (30) indicate that U projects φ and k in a space orthogonal to the column vectors of A. Vectors δ, expressed in equation (27), and $$\chi = Uk \quad (37)$$

are (N−M)-dimensional vectors in $\mathfrak{R}^{N-M}$ space orthogonal to A. Any χ is a point of a lattice in $\mathfrak{R}^{N-M}$. The quadratic form in equation (16) describes Voronoi regions with χ being the center.

Figure 3:
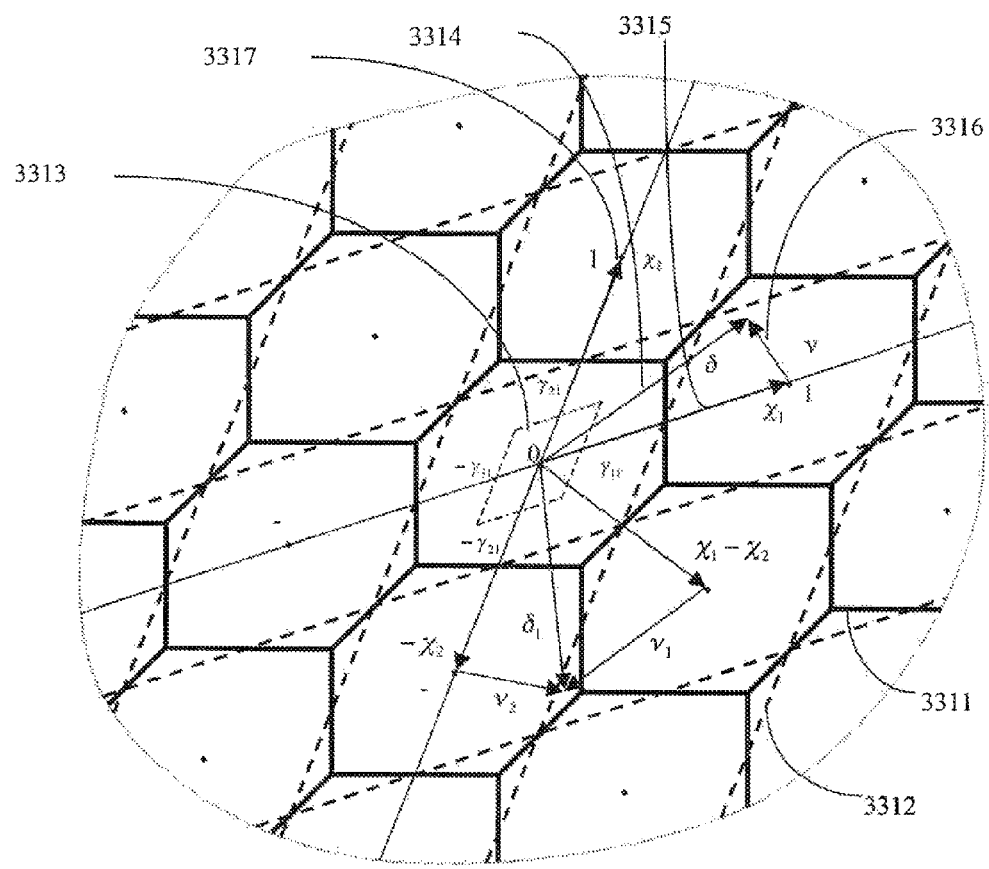
FIG. 3 is a diagram illustrating $\delta$, $\chi$, $\nu$, and Voronoi regions for various embodiments that have N–M=2.

Reference is now made to FIG. 3, which illustrates δ, χ, and Voronoi regions 3311 for N−M=2. The maximum likelihood estimation of k according to equation (16) implies finding (−k), that projection U(−k) is a center of Voronoi region χ with δ inside of this Voronoi region. Thus, if the k that minimizes equation (16) is known, then $$U(\phi + k) = \delta - \chi \quad (38)$$

The center of the Voronoi region 3311 that is closest to δ can be approximately estimated as:

$$\chi = \text{rnd}[\delta] \quad (39)$$

In various embodiments, the rounding region 3312 is used instead of Voronoi region 3311, and equation (38) can be written as:

$$\nu = \text{rrni}\{\delta\} \quad (40)$$

Considering the ideal case when there are no phase errors and, n=0 then: $\phi = \phi_0$, $\phi + k = A\Theta$, and $\delta = \chi_j$ in $\mathfrak{R}^{N-M}$ for any Θ. Consequently, if vector $\nu \neq 0$, it is a projection of an N-dimensional error vector n on $\mathfrak{R}^{N-M}$ orthogonal to A. Any N-dimensional vector n can be represented as a sum of components lying in $\mathfrak{R}^M$ where column vectors $a_i$ from matrix A are allocated, and components in $\mathfrak{R}^{N-M}$ that are orthogonal to A. The procedure of projecting n onto $\mathfrak{R}^{N-M}$ excludes components allocated in $\mathfrak{R}^M$ from the result of the projection, and it leaves components in $\mathfrak{R}^{N-M}$ that are the elements of v. Thus, vector ν is defined by phase errors only, and in some embodiments it is used in the estimation of noise parameters along with estimation of Θ.

Figure 4:
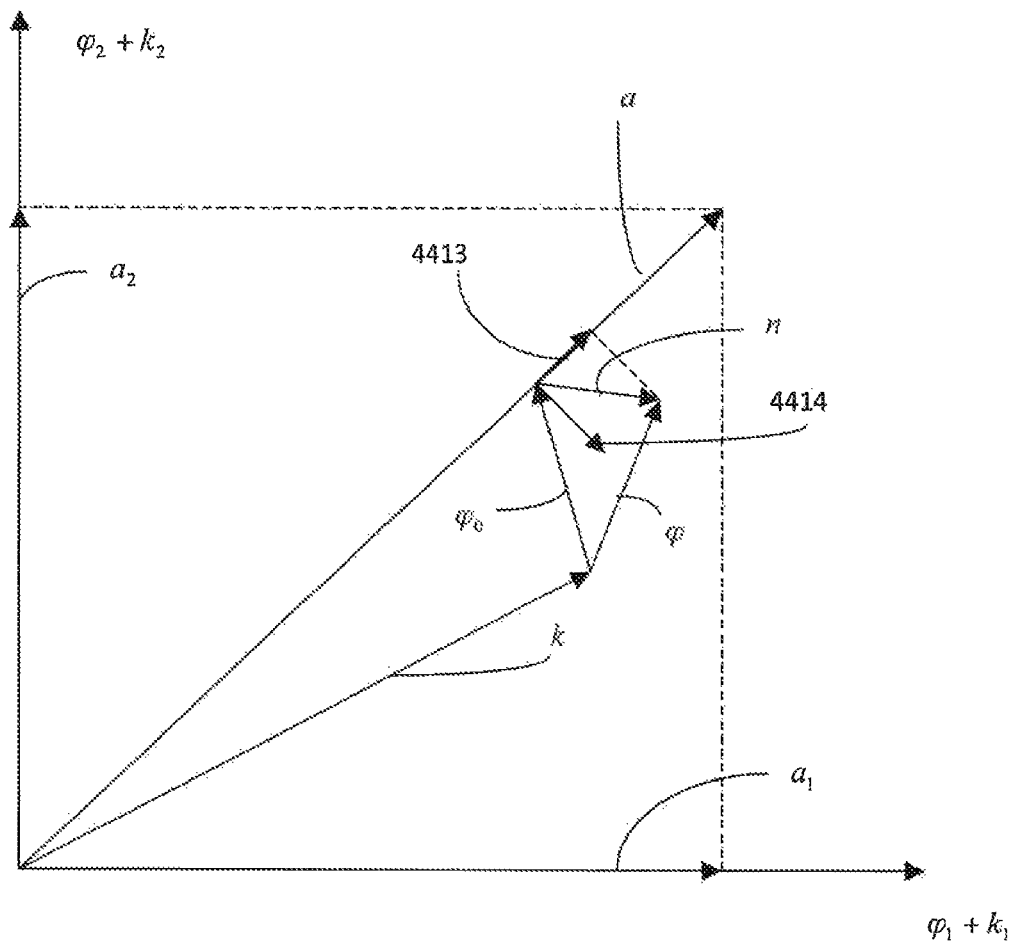
FIG. 4 is a graph illustrating the relationship between $\phi$, k, a, and n for various embodiments of interferometers that comprise a linear antenna array with two baselines.

Reference is now made to FIG. 4, which illustrates the relationship between φ, k, a, and n for various embodiments of interferometers that comprise a linear antenna array with two baselines. Vector n is represented as a sum of two components 4413 and 4414. Component 4413 is allocated in the line of a. Component 4414 can be calculated as ν, shown in equation (40). The two dimensional vector ν in $\mathfrak{R}^{N-M}$ for N−M=2 is shown in FIG. 3. In various embodiments, the elements of v are sent to a postprocessor (e.g., 2209 in FIG. 2) as noise parameters.

Figure 5:
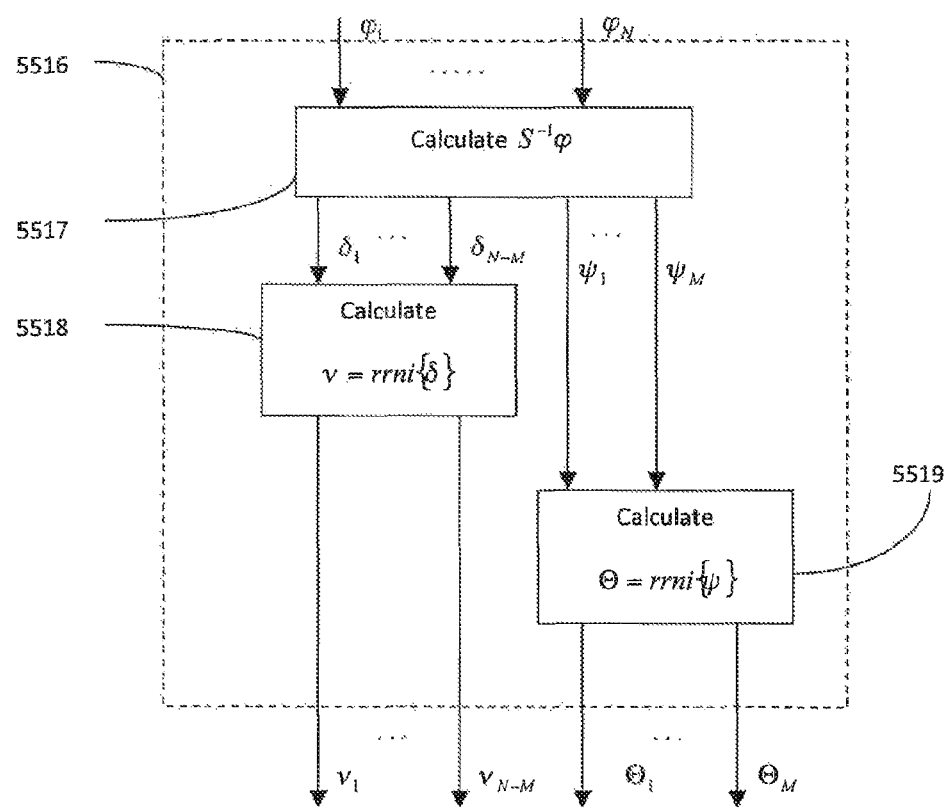
FIG. 5 is a block diagram illustrating various embodiments of a combined estimator.

Reference is now made to FIG. 5, which is a block diagram illustrating various embodiments of a combined estimator 5516 that calculates Θ and the elements of v. In various embodiments, phase measurements converter module 5517 processes the input vector φ, and calculates δ and ψ through the use of equations (27) and (28). In addition, in various embodiments, sought parameters estimator module 5519 utilizes equation (36) to calculate Θ. Noise parameters calculator module 5518 performs equation (40) and calculates noise parameters v. In various embodiments, these noise parameters are sent from combined estimator 5516 to a postprocessor (e.g., 2209 in FIG. 2) along with Θ.

In some embodiments, the whole vector v is not inputted into the postprocessor. In some such embodiments, the combined estimator can output a noise parameter, which in some embodiments is calculated as the length of vector v. This parameter α is related to the length of noise vector n and in various embodiments is used as a parameter that indicates how noisy is the estimate of Θ. The noise parameter α can be calculated according to:

$$\alpha = \left(\sum_{i=1}^{N-M} v_i^2\right)^{1/2} \quad (41)$$

Figure 6:
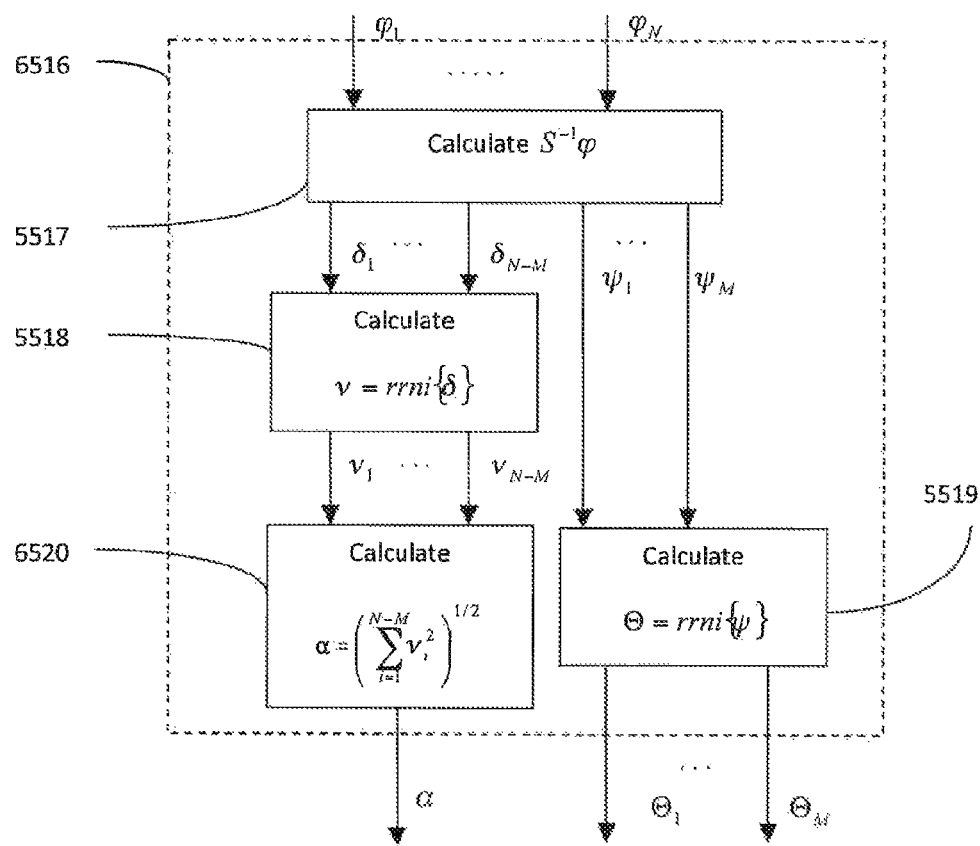
FIG. 6 is a block diagram illustrating various embodiments of a combined estimator.

Reference is now made to FIG. 6, which is a block diagram illustrating various embodiments of a combined estimator 6516 that calculates α along with Θ. In various embodiments, phase measurements converter module 5517 processes the input vector φ and calculates $S^{-1}\phi$. In various embodiments, noise parameters calculator module 5518 calculates v according to equation (40) and sought parameters estimator module 5519 calculates Θ according to equation (36). In some embodiments, common noise parameter estimator 6520 calculates noise parameter α according to equation (41). In various embodiments, α and Θ are sent to a postprocessor (e.g., 2209 in FIG. 2) and, in some such embodiments, the postprocessor utilizes the magnitude of α as a criterion for the acceptance of the associated Θ values. Thus, in some embodiments, if the magnitude of α exceeds a threshold, then the associated Θ values are discarded and not utilized in the determination of ζ.

In some embodiments, alternative methods are used to estimate a noise parameter. For example, in some embodiments, a noise parameter is estimated by detecting whether or not v is out of the (N−M) dimensional parallelotope with center at χ (39), and with sizes defined by thresholds $0 \le \gamma_{ij} < 0.5$. Reference is again made to FIG. 3. Parallelotope 3313 is the parallelotope in $\mathfrak{R}^2$ for χ=0, that corresponds to an embodiment when N−M=2. Rounding regions 3312 corresponds to the rounding procedure expressed in equation (39). Vector v illustrated in FIG. 3 is shown inside of a rounding region 3312. In various embodiments, every $i^{th}$ element of v is compared with corresponding threshold $\gamma_{ij}$ to detect if v is out of $j^{th}$ parallelotope 3313. Several parallelotopes can be used to detect or to quantify how far vector v is from the center of rounding region 3312. For example, referring to FIG. 7, that illustrates the case with three threshold parallelotopes in $\mathfrak{R}^2$. These are examples only and in some embodiments any appropriate number of parallelotopes can be used.

A vector of Z noise parameters ε can be obtained by comparing $v_i$ with Z thresholds corresponding to Z parallelotopes, as in the following:

$$\varepsilon_j = (\beta_{1j} \lor \beta_{2j} \lor \ldots \lor \beta_{(N-M)j}); \quad j = 1, \ldots Z \quad (42)$$

$$\beta_{ij} = \begin{cases} 1, & |v_i| \ge \gamma_{ij} \\ 0, & |v_i| < \gamma_{ij} \end{cases} \quad (43)$$

Where ∨ in equation (42) is a logical disjunction, and $|v_i|$ in equation (43) is an absolute value of $v_i$. Noise parameter q can be calculated according to:

$$q = \text{count}[\varepsilon] \quad (44)$$

Where count[ ... ] is a procedure of counting number of elements of the binary vector in the square brackets that are a logical "1", obtained as shown for example in equation (43). If every $\gamma_{ij} < \gamma_{i(j+1)}$, then q shows the number of largest parallelotope with v outside of it. Thus noise parameter q shows how far vector v is from the center of rounding region 3312.

Figure 7:
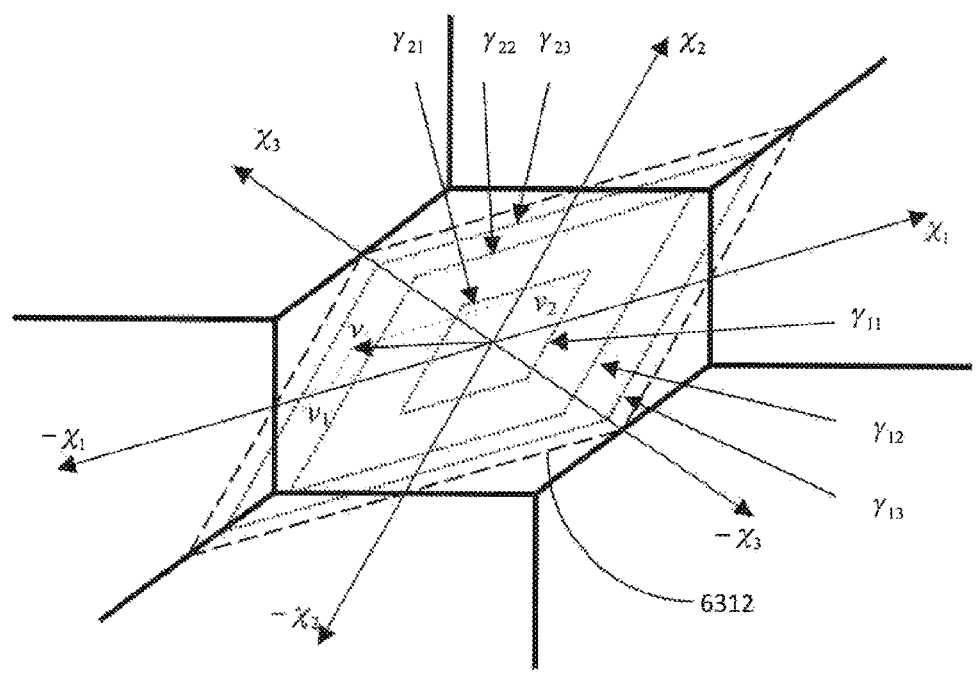
FIG. 7 is a diagram illustrating a Voronoi region and three threshold parallelotopes in $\mathfrak{R}^2$ for various embodiments.
Figure 8:
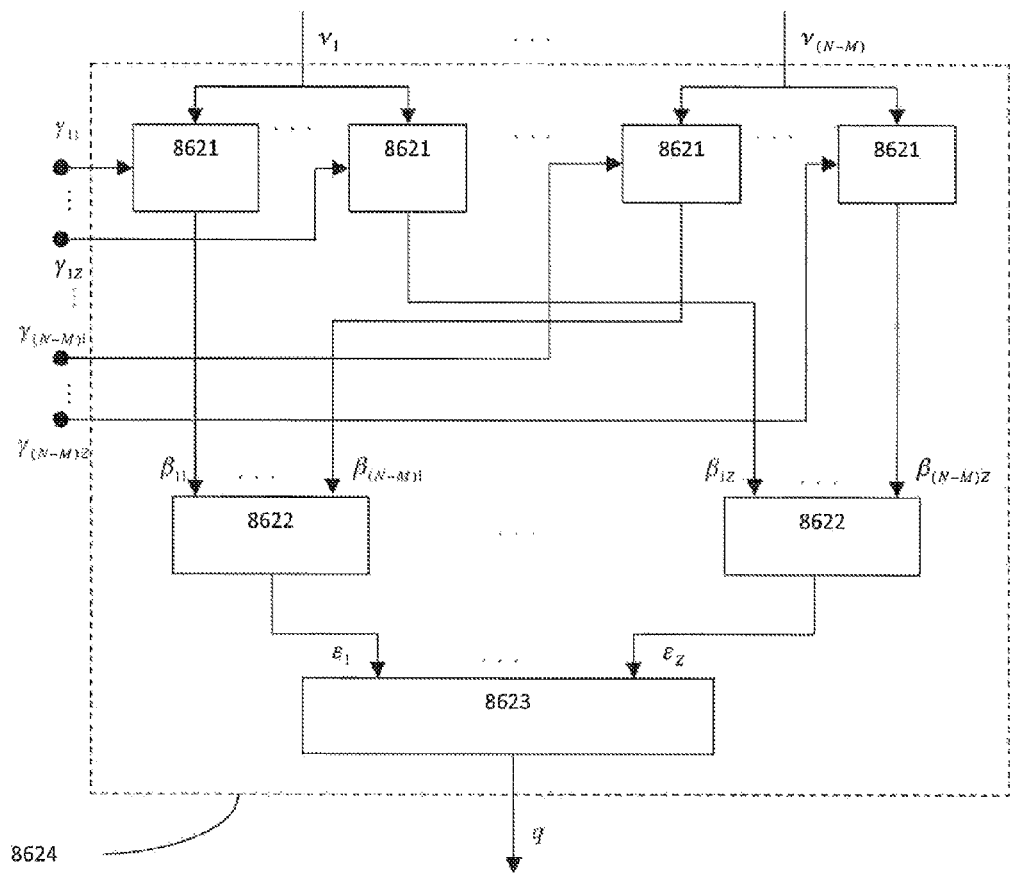
FIG. 8 is a block diagram illustrating various embodiments of a discrete noise parameter estimator.

Reference is now made to FIG. 8, which illustrates various embodiments of a discrete noise parameter estimator 8624 that calculates q in accordance with equation (44). Each $i^{th}$ comparison module 8621 compares the magnitude of $|v_i|$ with $\gamma_{ij}$ and calculates $\beta_{ij}$ according to equation (43). Logical disjunction module 8622 performs the logical disjunction procedure according to equation (42). Counting module 8623 counts discrete noise parameter q according to equation (44). FIG. 7 illustrates the relationship between $v_i$, $\gamma_{ij}$, $\beta_{ij}$, $\epsilon_j$, q, and rounding region 3312 for various embodiments of an interferometer with N−M=2.

Figure 9:
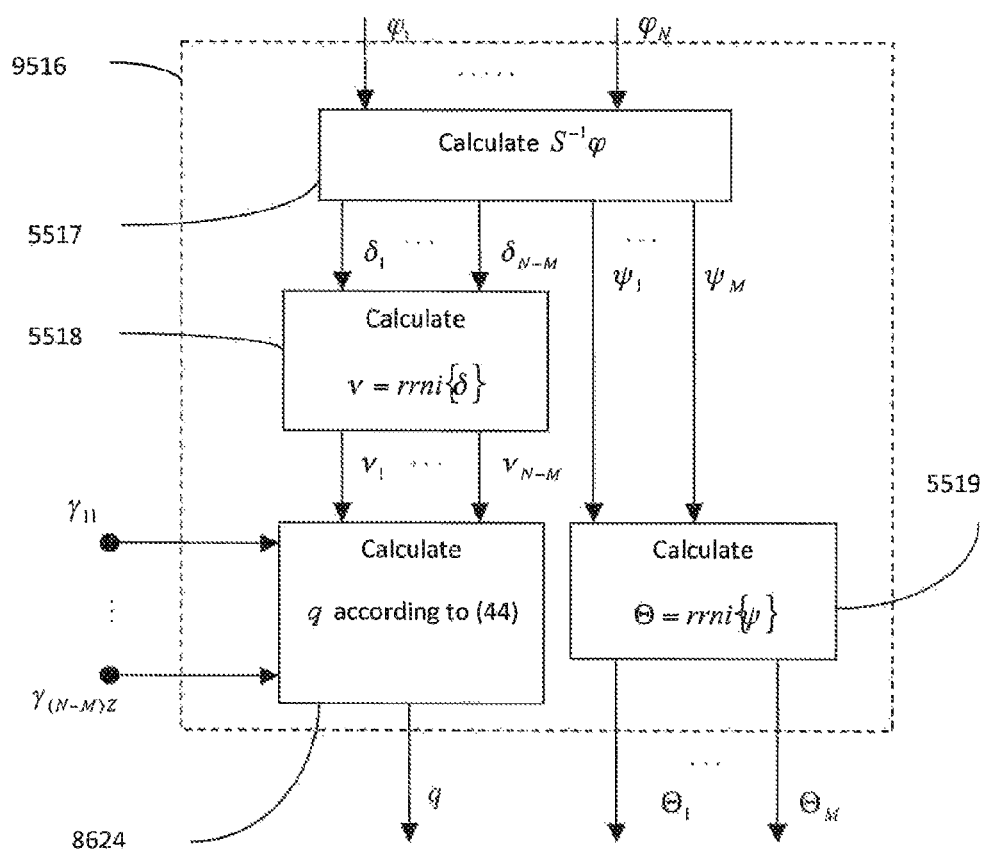
FIG. 9 is a block diagram illustrating various embodiments of a combined estimator.

Reference is now made to FIG. 9, which is a block diagram that illustrates various embodiments of a combined estimator 9516 that calculates Θ according to equation (36) and q according to equation (44). In various embodiments, phase measurements converter module 5517 processes the input vector φ and calculates $S^{-1}\phi$. In various embodiments, noise parameters calculator module 5518 calculates v according to equation (40) and sought parameters estimator module 5519 calculates Θ according to equation (36). In some embodiments, discrete noise parameter estimator 8624 calculates discrete noise parameter q according to equation (44). In some embodiments, q and Θ are sent to a postprocessor (e.g., 2209 in FIG. 2), and in some such embodiments, the postprocessor utilizes the magnitude of q as a criterion for the acceptance of the associated Θ values. Thus, in some embodiments, if the magnitude of q exceeds a threshold, then the associated Θ values are discarded and not utilized in the determination of In various embodiments, the combined estimator 9516 and discrete noise parameter estimator 8624 have (N−M)*Z inputs of threshold $\gamma_{ij}$ values. In some embodiments, the magnitudes of those threshold values are set to be constant. In various other embodiments, these threshold values can be variable. In some embodiments, the threshold $\gamma_{ij}$ values are generated internally by the combined estimator 9516.

In various embodiments, both vectors v and ψ are utilized during the estimation of Θ, according to:

$$\Theta = \text{rrni}\{H\xi\} \quad (45)$$

Where $\xi$ is a vector combining $v$ and $\psi$ as follows:

$$\xi = \begin{pmatrix} v \\ \psi \end{pmatrix} \qquad (46)$$

In various embodiments, the accuracy of $\Theta$ calculated according to equation (45) is less sensitive to the phase errors than the accuracy of $\Theta$ when calculated according to equation (36).

Figure 10:
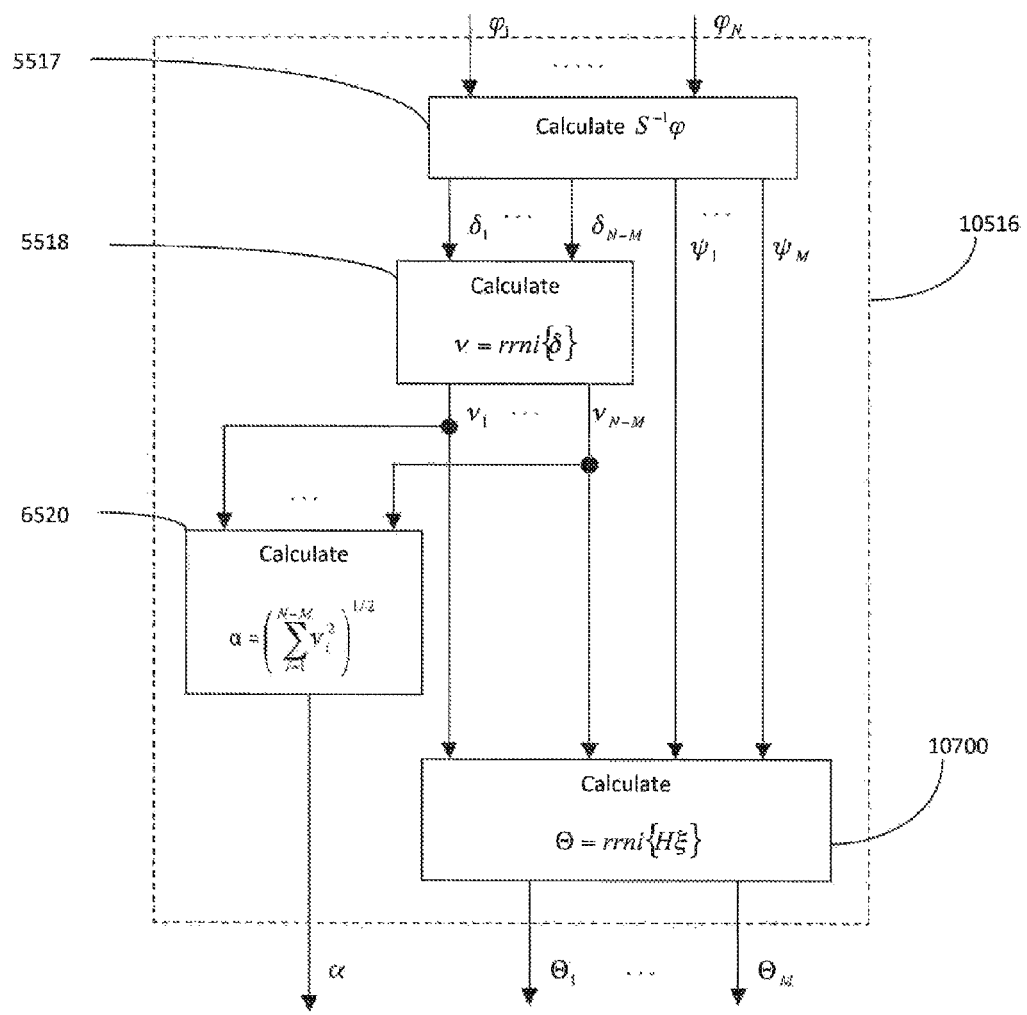
FIG. 10 is a block diagram illustrating various embodiments of a combined estimator.

Reference is now made to FIG. 10, which is a block diagram illustrating various embodiments of a combined estimator 10516 that calculates $\alpha$ along with $\Theta$. In various embodiments, phase measurements converter module 5517 processes the input vector $\phi$ and calculates $S^{-1}\phi$. In various embodiments, noise parameters calculator module 5518 calculates $v$ according to equation (40) and a second type sought parameters estimator module 10700 calculates $\Theta$ according to equation (45). In some embodiments, common noise parameter estimator 6520 calculates common noise parameter $\alpha$ according to equation (41). In some embodiments, the noise parameter $\alpha$ output by common noise parameter estimator 6520 and the values of $\Theta$ output by second type sought parameters estimator module 10700 are outputs of the combined estimator 10516.

In various embodiments, $\alpha$ and $\Theta$ are sent to a postprocessor (e.g., 2209 in FIG. 2) and in some such embodiments the postprocessor utilizes the magnitude of $\alpha$ as a quality parameter or as a criterion for the acceptance of the associated $\Theta$ values. Thus in some embodiments, if the magnitude of $\alpha$ exceeds a threshold, then the associated $\Theta$ values are discarded and not utilized in the determination of $\zeta$.

In various embodiments, the ambiguity of the phase measurement is resolved correctly and $\Theta$ is calculated without abnormal errors when equation (45) is utilized, and corresponding $\delta$ is inside of the right rounding region 3312, as illustrated by the dashed lines, in FIG. 3. Vectors $\delta$ (3314), $\chi_1$ (3315), and $v$ (3316) in FIG. 3 illustrate the correct ambiguity resolution if $v$ is in the rounding region 3312 with $\chi_1$ in the center, and $k$ projected into $\chi_1$ would give the correct $\Theta$ according to equation (15) for n=0. An incorrect ambiguity resolution decision can occur if $\delta$ is supposed to be rounded to $\chi_i$, but due to a high level of phase errors is rounded to $\chi_i + \chi_j$ instead. In such a situation $\Theta$ might be calculated with abnormally high errors. For instance, consider the case where, for some angle of arrival, $\delta$ is supposed to be rounded to $\chi_2$ (indicated by reference indicium 3317), if the level of phase errors is high, $\delta$ may be rounded to $\chi_1$ (indicated by reference indicium 3315) instead. This can result in abnormally high errors in the estimation of the sought parameters. In various embodiments, the decision is made that if $v$ is close to a rounding region border, then there is a relatively high probability that it was calculated with an incorrect ambiguity resolution. Accordingly, in some embodiments, the corresponding $\Theta$ estimate calculated using equation (45) with such a value for the $v$ vector can be considered as unreliable in such embodiments and $\Theta$ is rejected in the postprocessor. In various embodiments, this kind of rejection increases the probability of the correct ambiguity resolution. Thus, in various embodiments, the magnitude of one or more noise parameters, such as for example but not limited to, $\alpha$ or $q$ are considered to be a criterion for a decision as to whether or not to reject a $\Theta$ estimate. Parameter $\alpha$ shows the length of $v$.

However, it does not inform about the position of $v$ regarding the borders of rounding region 3312. Parameter $q$ indicates how close $v$ is to the border of the rounding region 3312 and, accordingly, in some embodiments, $q$ is a more convenient criterion for rejection in postprocessing.

Figure 11:
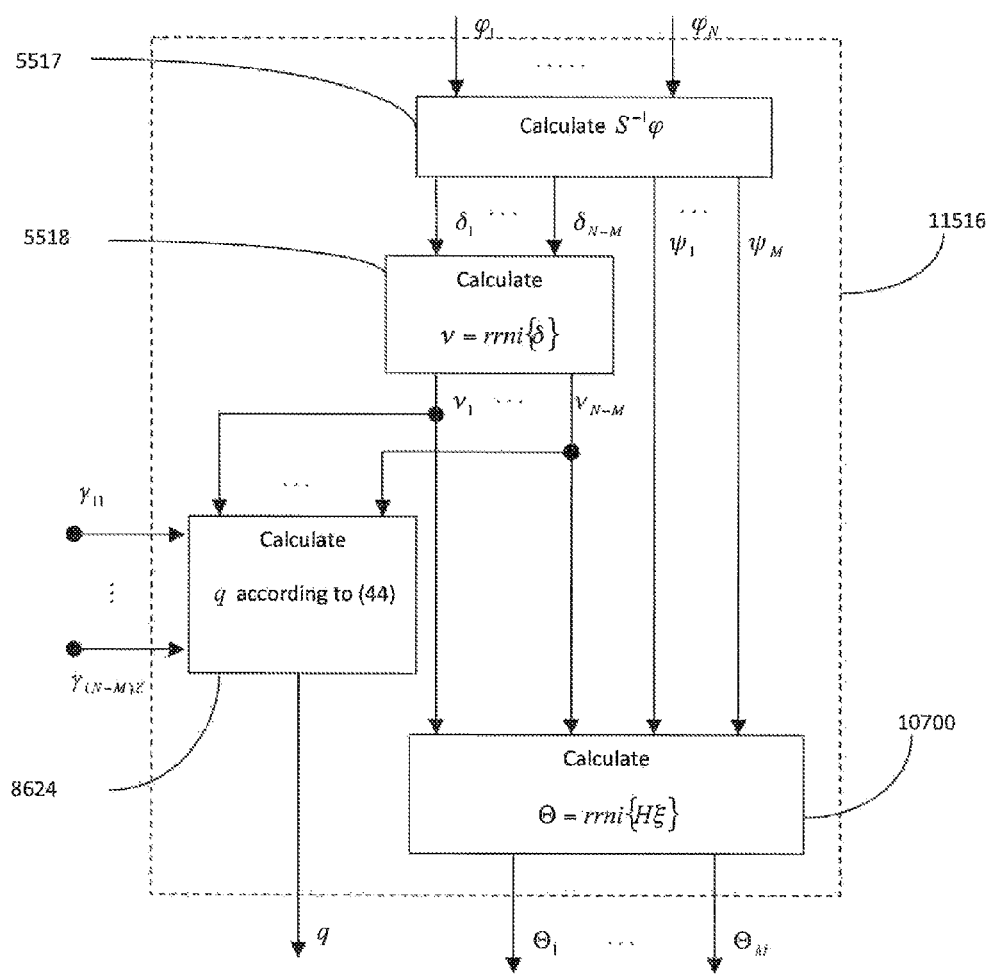
FIG. 11 is a block diagram illustrating various embodiments of a combined estimator.

Reference is next made to FIG. 11, which is a block diagram illustrating various embodiments of combined estimator 11516 that calculates $\Theta$ according to equation (45) and q according to equation (44). In various embodiments, phase measurements converter module 5517 processes input vector $\phi$ and calculates $S^{-1}\phi$. In various embodiments, noise parameters calculator module 5518 calculates $v$ according to equation (40), second type sought parameters estimator module 10700 calculates $\Theta$ according to equation (45), and discrete noise parameter estimator 8624 calculates q according to equation (44). In various embodiments, combined estimator 11516 and discrete noise parameter estimator 8624 have (N−M)*Z inputs of threshold $\gamma_{ij}$ values. In some embodiments, the magnitudes of these threshold values can be set to be constants. In various other embodiments, these threshold values can be variable and can be adjusted as desired. In some embodiments, the q output of discrete noise parameter estimator 8624 and the $\Theta$ outputs of second type sought parameters estimator module 10700 are outputs of the combined estimator 11516.

Figure 12:
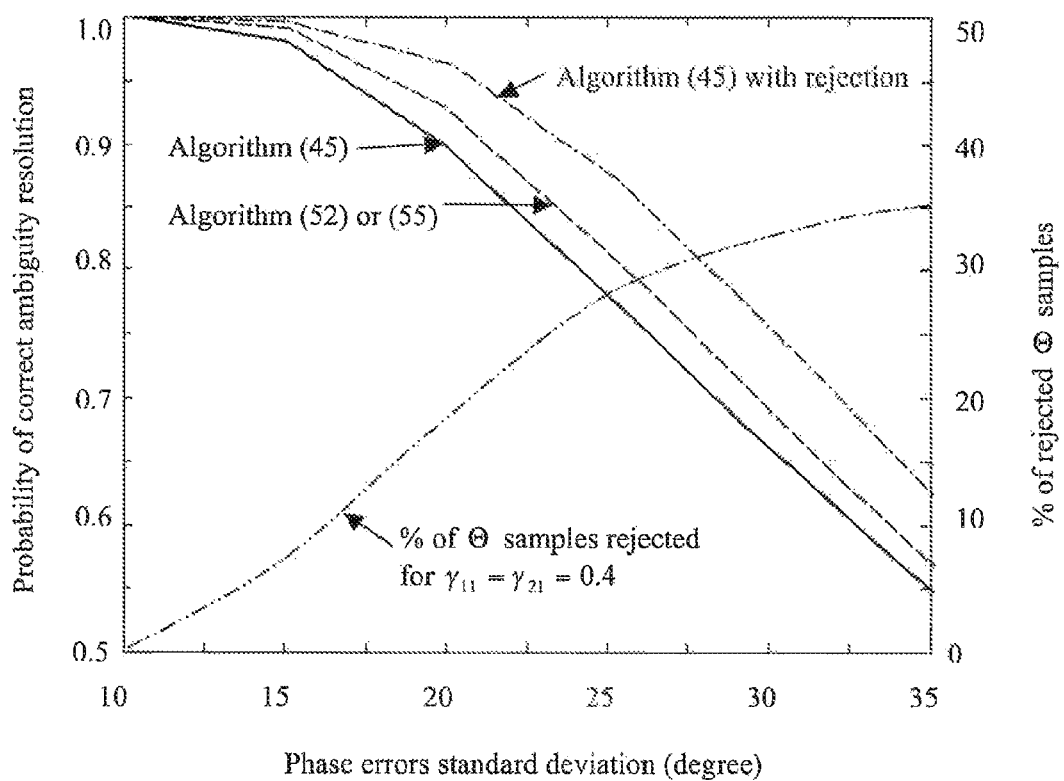
FIG. 12 is a graph that illustrates, for various embodiments, the difference between the probability of correct ambiguity resolution in the calculation of interferometric parameters with and without the rejection of measurements based on the level of noise parameter.

Reference is now made to FIG. 12, which is a graph that illustrates, for various embodiments, the difference between the probability of correct ambiguity resolution in the calculation of $\Theta$ according to equation (45) without rejection and with rejection on q=1 if only one threshold parallelotope 3313 with $\gamma_{11} = \gamma_{21} = 0.4$ is considered in the discrete noise parameter estimator 8624. The probability of correct ambiguity resolution has been estimated after 10000 trials in a simulation of the combined estimator 11516 for a direction finding interferometer with a planar antenna array with N=4, M=2, and $$A = \begin{pmatrix} -3 & 2 \\ 0 & 3 \\ 1 & 6 \\ 3 & 3 \end{pmatrix} \qquad (47)$$

As can be seen from FIG. 12, in some embodiments, the rejection of unreliable $\Theta$ samples in the postprocessor allows for up to a 10% increase in the probability of correct ambiguity resolution for the particular conditions listed above.

Figure 13:
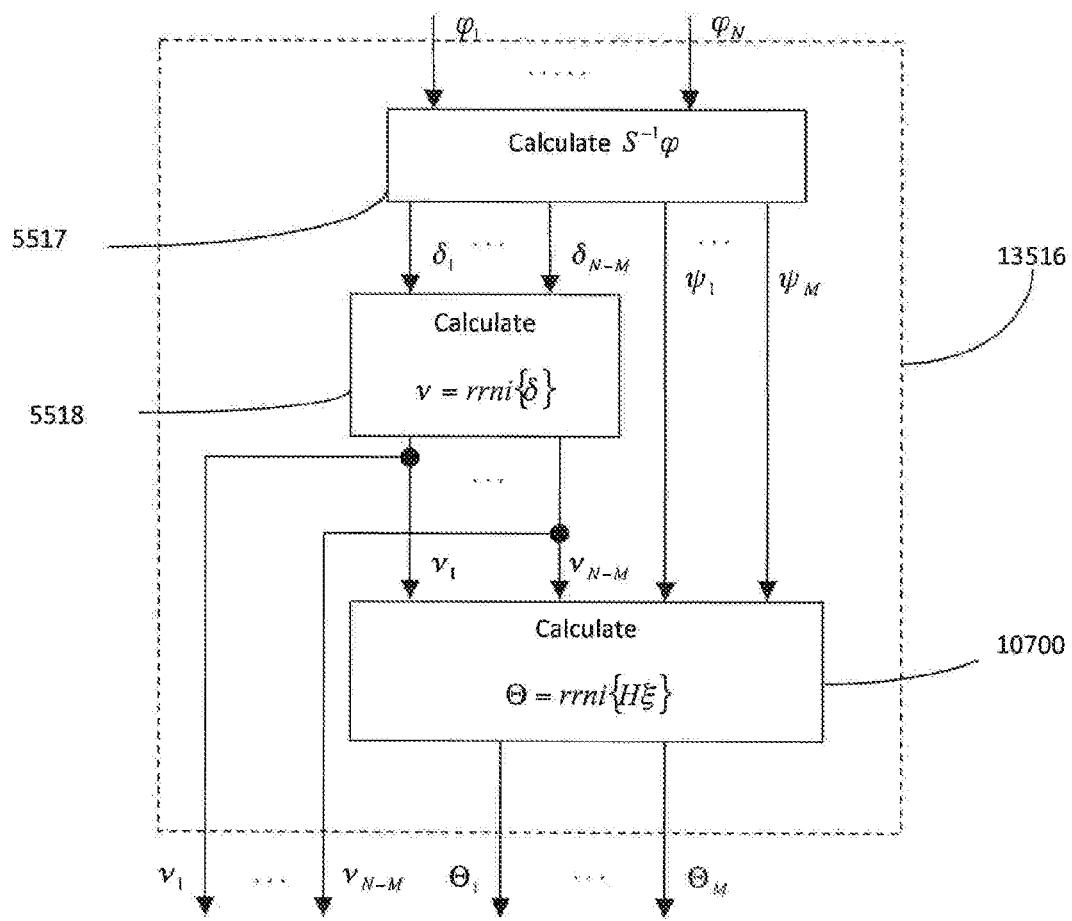
FIG. 13 is a block diagram illustrating various embodiments of a combined estimator.

Reference is now made to FIG. 13, which is a block diagram that illustrates various embodiments of a combined estimator 13516 that calculates $\Theta$ according to equation (45) and outputs a vector of noise parameters along with $\Theta$. As FIG. 13 indicates, in some embodiments, the direction finding interferometers may utilize the whole vector $v$ for postprocessing. Phase measurements converter module 5517 processes input vector $\phi$ and calculates $S^{-1}\phi$. Noise parameters calculator module 5518 determines $v$ in accordance with equation (40). Second type sought parameters estimator module 10700 calculates $\Theta$ according to equation (45). In some embodiments, the vector of noise parameters $v$ outputted by noise parameters calculator module 5518 and the $\Theta$ values outputted by second type sought parameters estimator module 10700 are outputs of combined estimator 13516.

In various embodiments, the use of equation (45) can be suboptimal, because it determines whether the vector $v$ is inside of rounding region 3312 as opposed to whether the vector $v$ is inside of Voronoi region 3311. Referring back to FIG. 3, it can be seen that rounding region 3312 does not completely correspond to the Voronoi region 3311, which is defined by the quadratic form in equation (16). In particular, it is possible for a δ vector to be inside rounding region 3312 but to be outside of the corresponding Voronoi region 3311 and vice versa. In addition, Voronoi region 3311 can have up to $2(2^{N-M}-1)$ sides, while the corresponding rounding region 3312 has $2(N-M)$ sides. Accordingly, the larger the number (N−M) is, the greater the difference between a Voronoi region 3311 and the corresponding rounding region 3312 tends to be.

In various embodiments, as a result of the lack of complete correspondence between the Voronoi region 3311 and the rounding region 3312, some samples of δ calculated by equation (27) and processed according to equations (40) and (45) produce the sought parameters with abnormally high errors due to incorrect ambiguity resolution. This can be illustrated with vector $\delta_1$ in FIG. 3. According to equation (45), $\delta_1$ will be rounded to $(\chi_1 - \chi_2)$ and $v_i$ will be used for calculation of Θ. However, k obtained according to the maximum likelihood in equation (16) corresponds to $(-\chi_2)$; $\delta_1$ is inside of Voronoi region with center at $(-\chi_2)$ and $v_2$ should be used for correct calculation of Θ. In various embodiments, the optimal determination using equation (16) can be significantly simplified with the use of vector ν determined according equation (40). Equation (16) corresponds to:

$$\chi^* = \operatorname*{argmin}_{\chi}((v+\chi_i)^T P(v+\chi_i)) \tag{48}$$

Where $$P = K^T C K, \tag{49}$$

$\chi_i$ are vectors which form Voronoi region 3311 with center at $\chi=0$. Equation (48) corresponds to:

$$\chi^* = \operatorname*{argmin}_{\chi}(0.5(\chi_i^T P \chi_i) + \chi_i^T \eta) \tag{50}$$

Where, $$\eta = Pv. \tag{51}$$

Voronoi region 3311 can have up to $2(2^{N-M}-1)$ sides. Vectors $\chi_i$, defining these sides and $\chi=0$ shall be considered in equation (50). Therefore, the number of $\chi_i$ to estimate them in equation (50) is not more than $(2^{N-M+1}-1)$. Such $\chi_i$ has only 0 and $\pm 1$ in its elements and, therefore, every $\chi_i^T \eta$ in equation (50) is a linear combination of corresponding elements of η. As far as set of $\chi_i$ forming Voronoi region 3311 for particular matrix A are predefined, it also predefines the set of linear combinations of corresponding elements of η to be considered in equation (50). The magnitudes of $0.5(\chi_i^T P \chi_i)$ are predefined constants, which do not depend on the phase measurements. In various embodiments, these conditions make a combined estimator designed based on the minimization procedure according to equation (50) more effective and efficient than a combined estimator that is designed around a computational procedure that is based on equation (16), especially given that equation (50), while more efficient given the above conditions, is nonetheless, in terms of the final estimate that is produced in the end, equivalent to equation (16).

After the searching of χ* according to equation (50) is performed, Θ can be estimated according to:

$$\Theta = rrni\{H\tau\}, \tag{52}$$

$$\tau = \begin{pmatrix} \rho \\ \psi \end{pmatrix}, \tag{53}$$

Where $$\rho = v + \chi^*; \tag{54}$$

or Θ can be estimated according to:

$$\Theta = rrni\{H\xi + f\}, \tag{55}$$

Where $$f = R\chi^*, \tag{56}$$

Where R is a part of matrix H as defined in equation (32).

Figure 14:
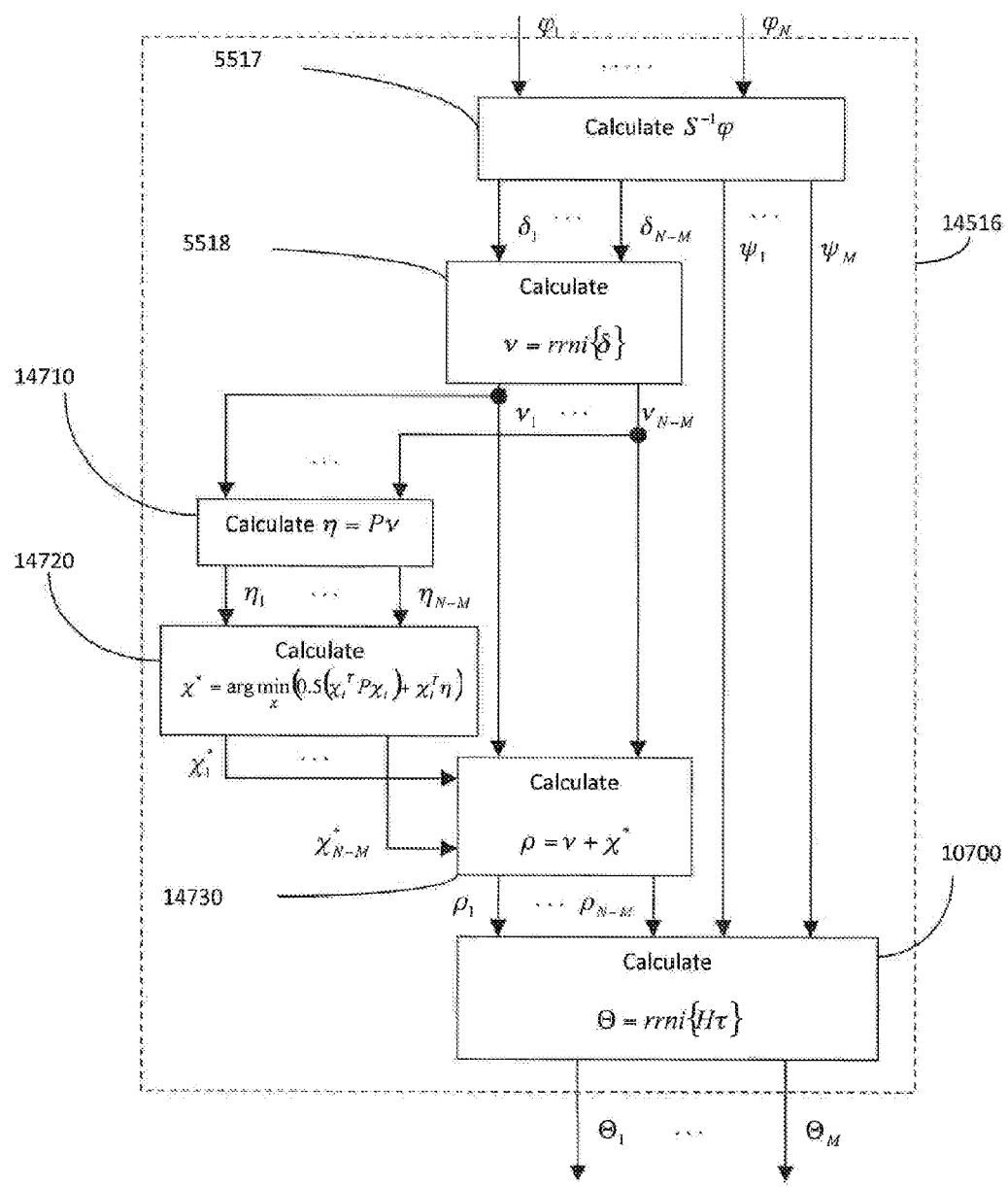
FIG. 14 is a block diagram illustrating various embodiments of a combined estimator.

Reference is next made to FIG. 14, which is a block diagram illustrating various embodiments of combined estimator 14516 that calculates a maximum likelihood estimate of Θ in accordance with equation (52). Phase measurements converter module 5517 processes the input vector φ and calculates $S^{-1}\phi$. Noise parameters calculator module 5518 calculates ν according to (40). Noise parameters converter module 14710 calculates η according to equation (51). Voronoi Region (VR) shift calculator module 14720 calculates χ* according to equation (50). Noise parameters corrector module 14730 calculates ρ according to equation (54). Second type sought parameters estimator module 10700 calculates Θ according to equation (52). In various embodiments, the outputs of second type sought parameters estimator module 10700 are the outputs of combined estimator 14516.

Figure 15:
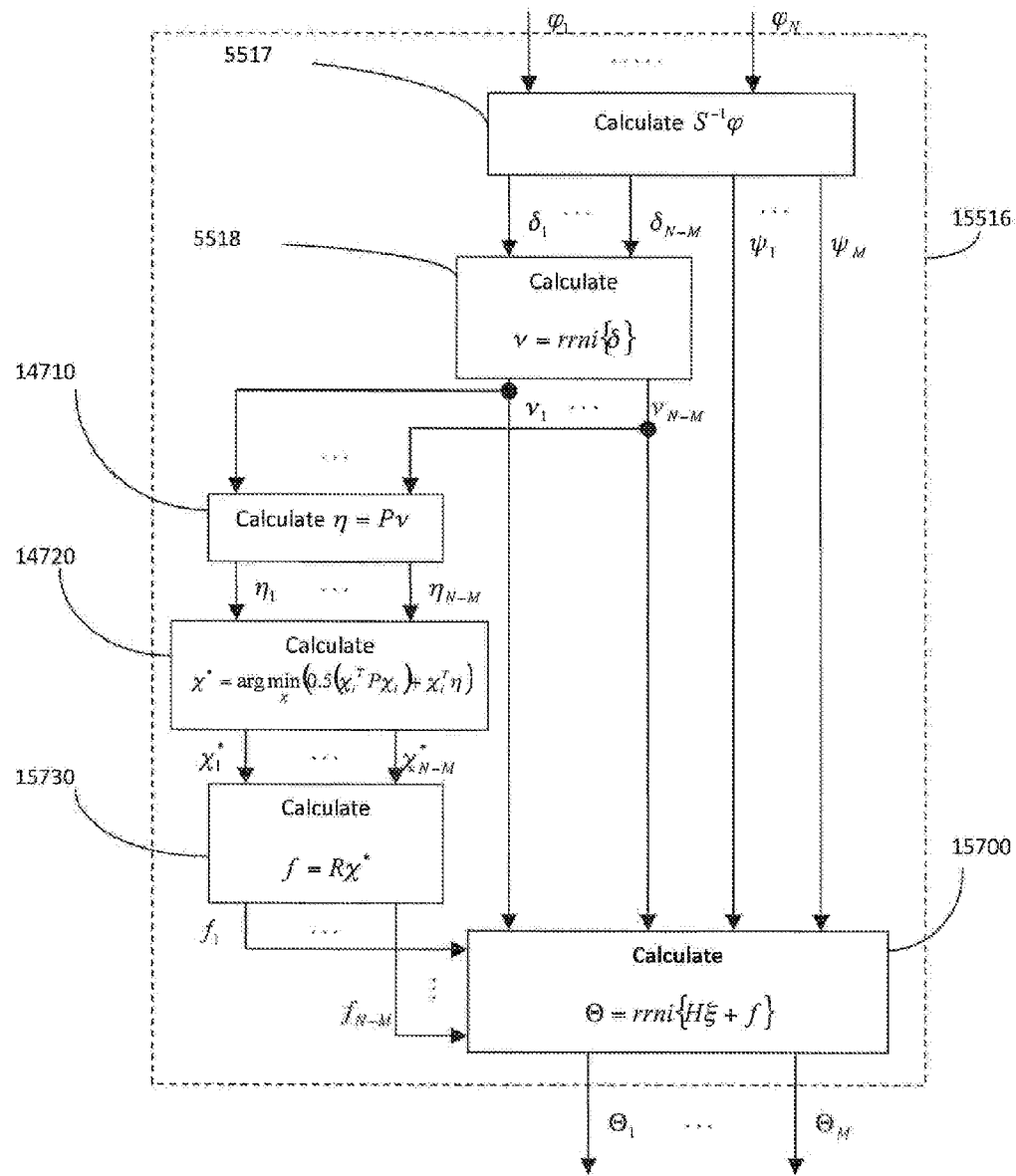
FIG. 15 is a block diagram illustrating various embodiments of a combined estimator.

Reference is next made to FIG. 15, which is a block diagram illustrating various embodiments of combined estimator 15516 that calculates a maximum likelihood estimate of Θ in accordance with equation (55). Phase measurements converter module 5517 processes input vector φ and calculates $S^{-1}\phi$. Noise parameters calculator module 5518 calculates ν according to equation (40). Noise parameters converter module 14710 calculates η according to equation (51). Voronoi Region shift calculator module 14720 calculates χ* according to equation (50). Second type noise parameters corrector module 15730 calculates f according to equation (56). Third type sought parameters estimator module 15700 calculates Θ according to equation (55). In various embodiments, the outputs of third type sought parameters estimator module 15700 are the outputs of combined estimator 15516.

Figure 22:
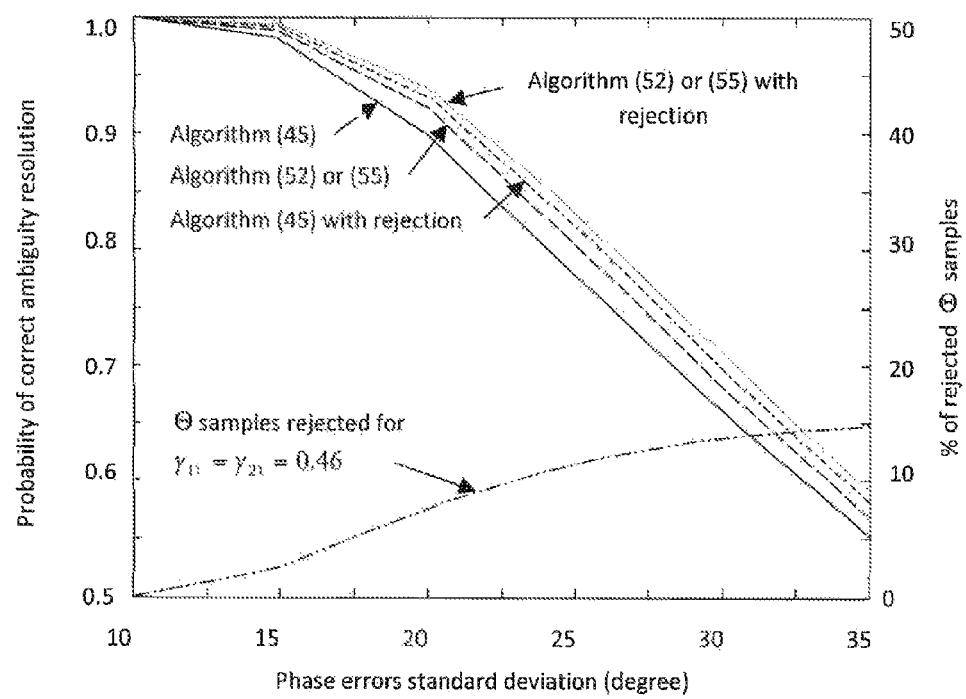
FIG. 22 is a graph that illustrates, for various embodiments, the difference between the probability of correct ambiguity resolution in the calculation of interferometric parameters with and without the rejection of measurements based on the level of noise parameter.

In various embodiments, given that equations (52) or (55) completely correspond to the maximum likelihood principle of estimation of Θ, the probability of correct ambiguity resolution for an combined estimator that is designed based on the use of either of these equations is greater than the probability of correct ambiguity resolution for a combined estimator that is designed based on the use of equation (45). For example, FIG. 22 and FIG. 12 are graphs illustrating the difference between those algorithms for matrix A defined in equation (47).

Figure 16:
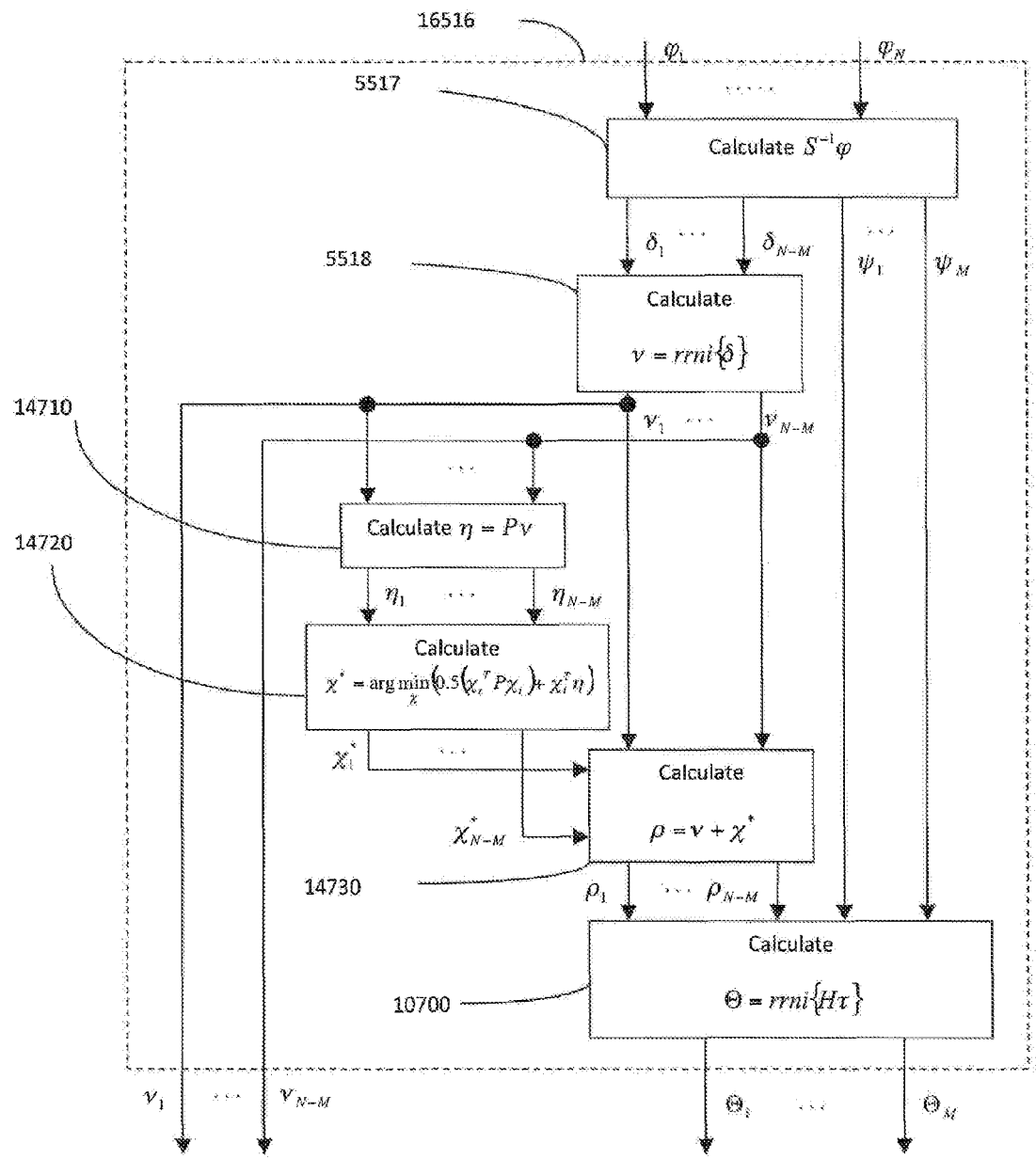
FIG. 16 is a block diagram illustrating various embodiments of a combined estimator.

Reference is next made to FIG. 16, which is a block diagram illustrating various embodiments of combined estimator 16516 that calculates a maximum likelihood estimate of Θ in accordance with equation (52), and also outputs the vector of noise parameters ν along with Θ. Phase measurements converter module 5517 processes input vector φ and calculates $S^{-1}\phi$. Noise parameters calculator module 5518 calculates ν according to equation (40). Noise parameters converter module 14710 calculates η according to equation (51). Voronoi Region shift calculator module 14720 calculates χ* according to equation (50). Noise parameters corrector module 14730 calculates ρ according to equation (54). Second type sought parameters estimator module 10700 calculates Θ according to equation (52). In various embodiments, the vector of noise parameters ν output by noise parameters calculator module 5518 and the values of Θ output by second type sought parameters estimator module 10700 are the outputs of combined estimator 16516.

Figure 17:
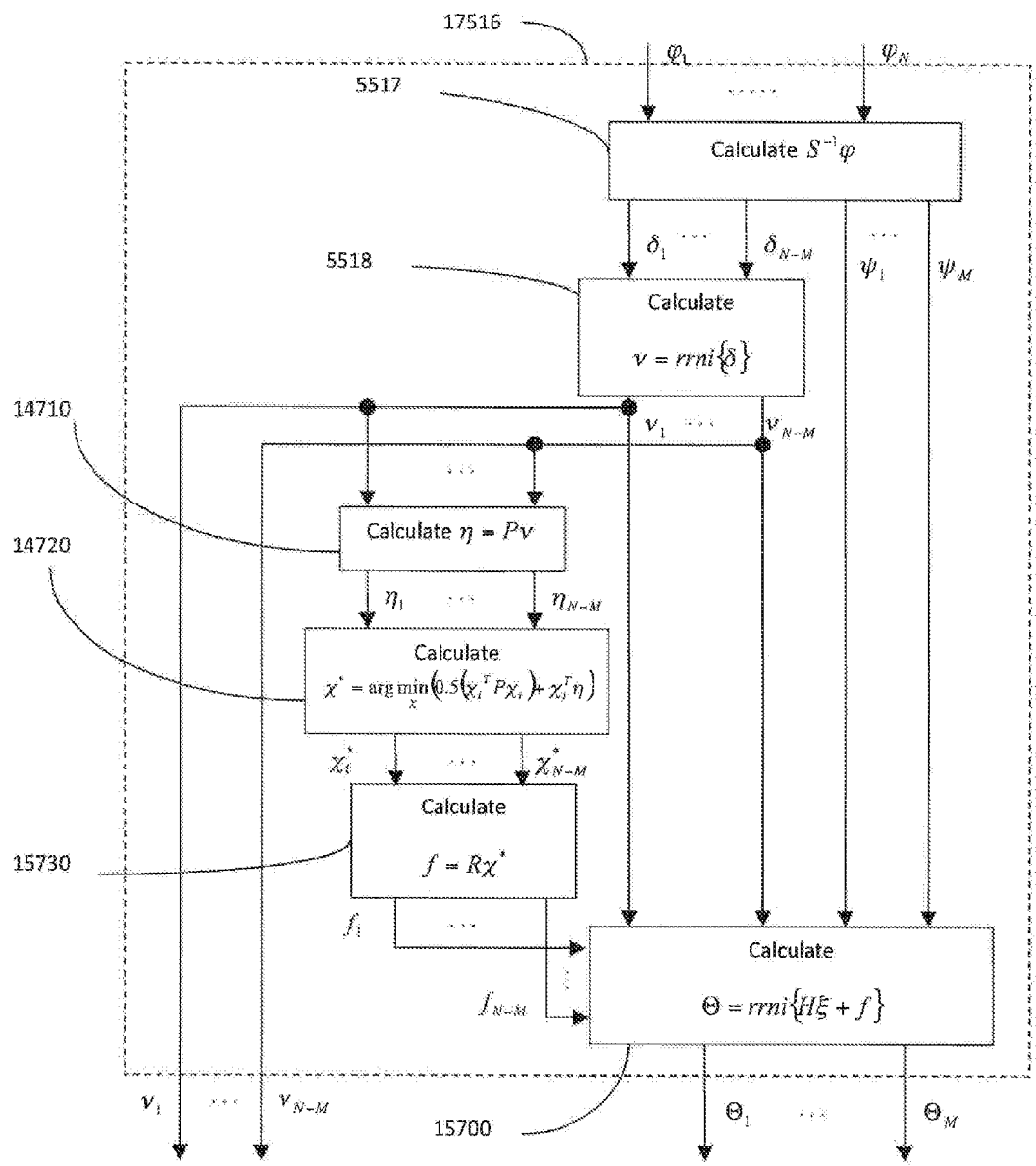
FIG. 17 is a block diagram illustrating various embodiments of a combined estimator.

Reference is next made to FIG. 17, which is a block diagram illustrating various embodiments of combined estimator 17516 that calculates a maximum likelihood estimate of Θ in accordance with equation (55), and also outputs the vector of noise parameters ν along with Θ. Phase measurements converter module 5517 processes input vector φ and calculates $S^{-1}φ$. Noise parameters calculator module 5518 calculates ν according to equation (40). Noise parameters converter module 14710 calculates η according to equation (51). Voronoi Region shift calculator module 14720 calculates χ* according to equation (50). Second type noise parameters corrector module 15730 calculates f according to equation (56). Third type sought parameters estimator module 15700 calculates Θ according to equation (55). In various embodiments, the vector of noise parameters ν output by noise parameters calculator module 5518 and the values of Θ output by third type sought parameters estimator module 15700 are the outputs of combined estimator 17516.

Figure 18:
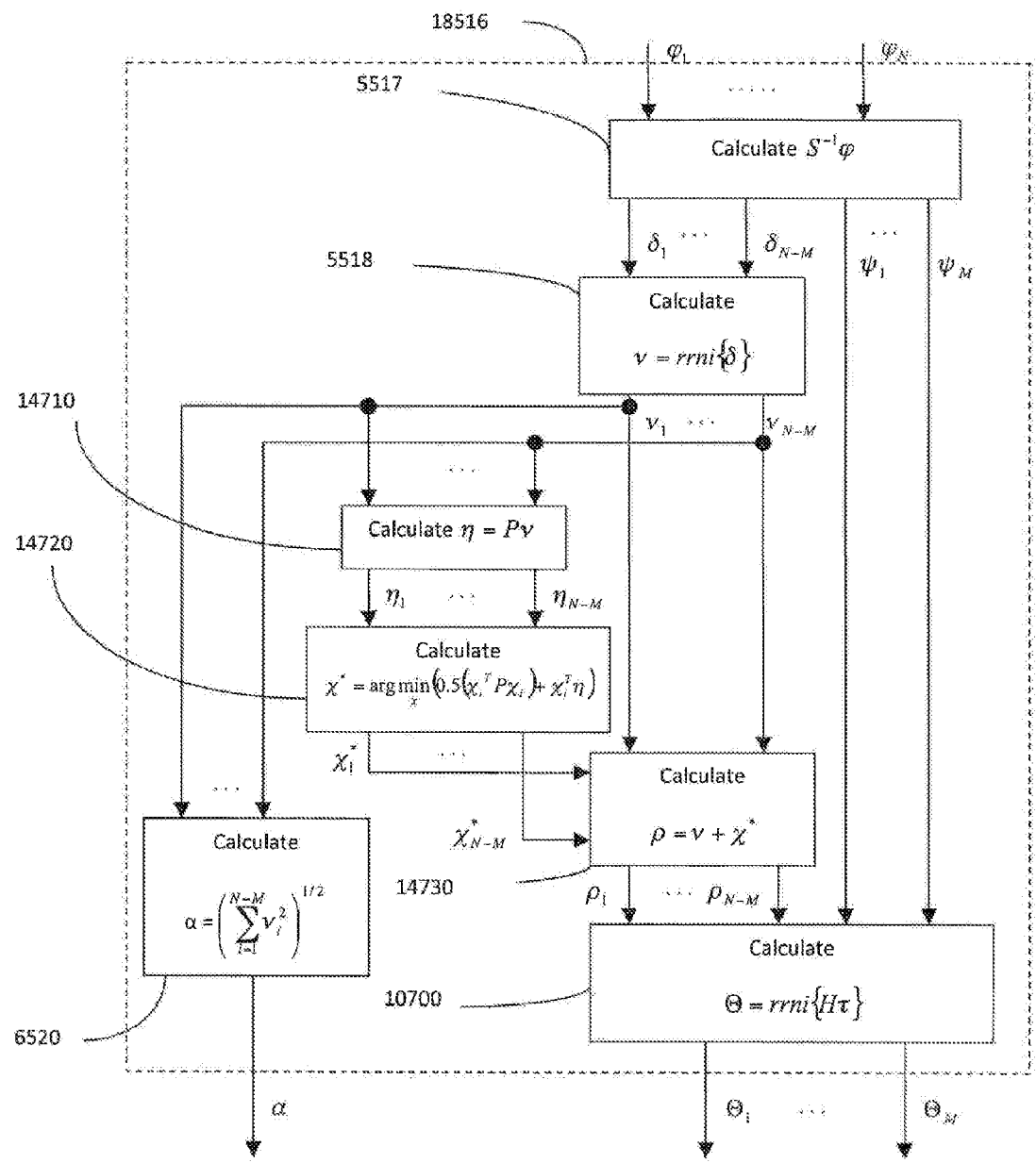
FIG. 18 is a block diagram illustrating various embodiments of a combined estimator.

Reference is next made to FIG. 18, which is a block diagram illustrating various embodiments of combined estimator 18516 that calculates a maximum likelihood estimate of Θ in accordance with equation (52) and common noise parameter α according to equation (41). Phase measurements converter module 5517 processes input vector φ and calculates $S^{-1}φ$. Noise parameters calculator module 5518 calculates ν according to equation (40). Noise parameters converter module 14710 calculates η according to equation (51). Voronoi Region shift calculator module 14720 calculates χ* according to equation (50). Noise parameters corrector module 14730 calculates ρ according to equation (54). Second type sought parameters estimator module 10700 calculates Θ according to equation (52). Common noise parameter estimator 6520 calculates α according to equation (41). In various embodiments, the common noise parameter α output by common noise parameter estimator 6520 and the values of Θ output by second type sought parameters estimator module 10700 are outputs of combined estimator 18516.

Figure 19:
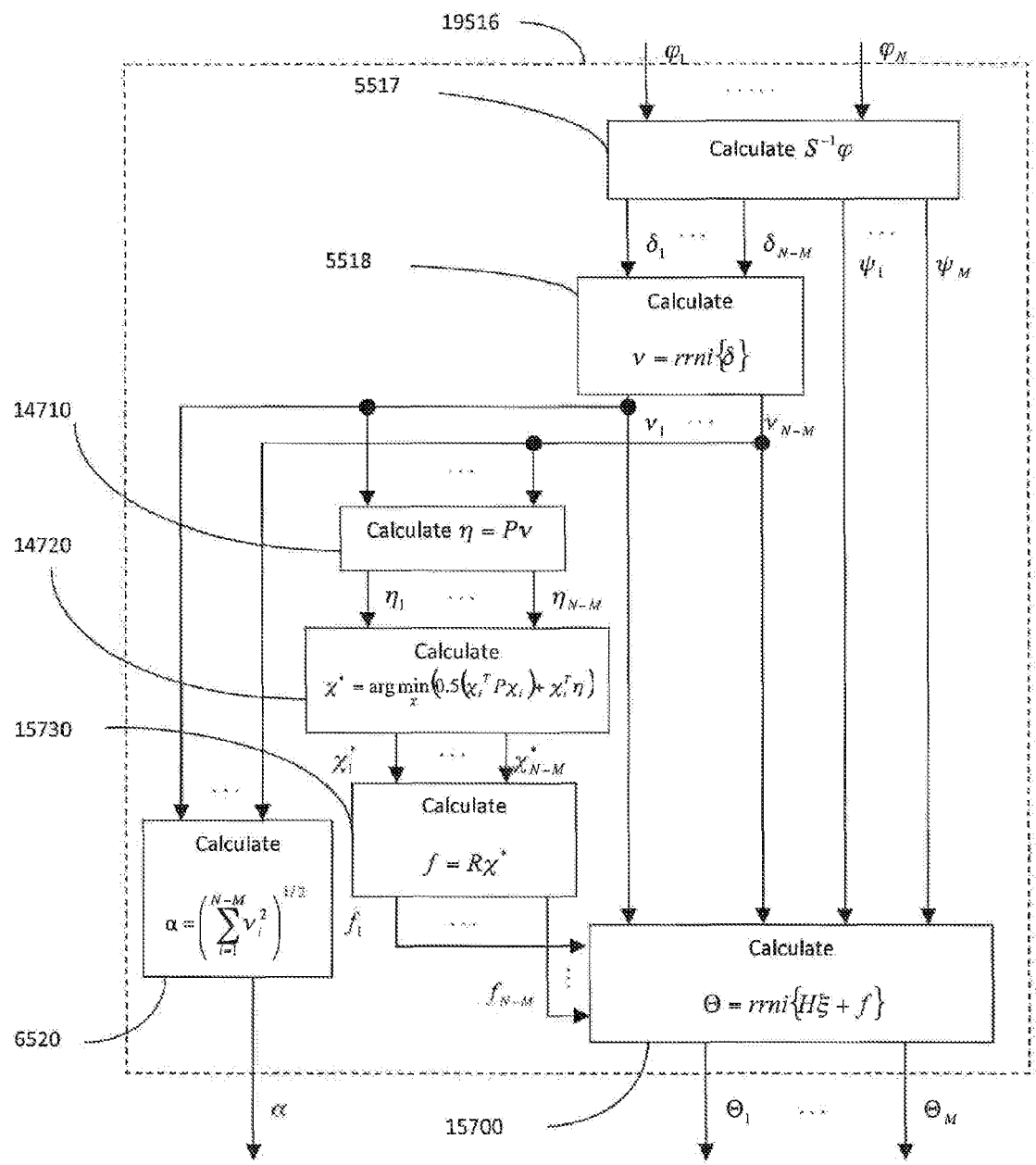
FIG. 19 is a block diagram illustrating various embodiments of a combined estimator.

Reference is now made to FIG. 19, which is a block diagram illustrating various embodiments of combined estimator 19516 that calculates a maximum likelihood estimate of Θ in accordance with equation (55) and common noise parameter α according to equation (41). Phase measurements converter module 5517 processes input vector φ and calculates $S^{-1}φ$. Noise parameters calculator module 5518 calculates ν according to equation (40). Noise parameters converter module 14710 calculates η according to equation (51). Voronoi Region shift calculator module 14720 calculates χ* according to equation (50). Second type noise parameters corrector module 15730 calculates f according to (56). Third type sought parameters estimator module 15700 calculates Θ according to equation (55). Common noise parameter estimator 6520 calculates α according to equation (41). In various embodiments, the common noise parameter α output by common noise parameter estimator 6520 and the values of Θ output by third type sought parameters estimator module 15700 are outputs of combined estimator 19516.

Figure 20:
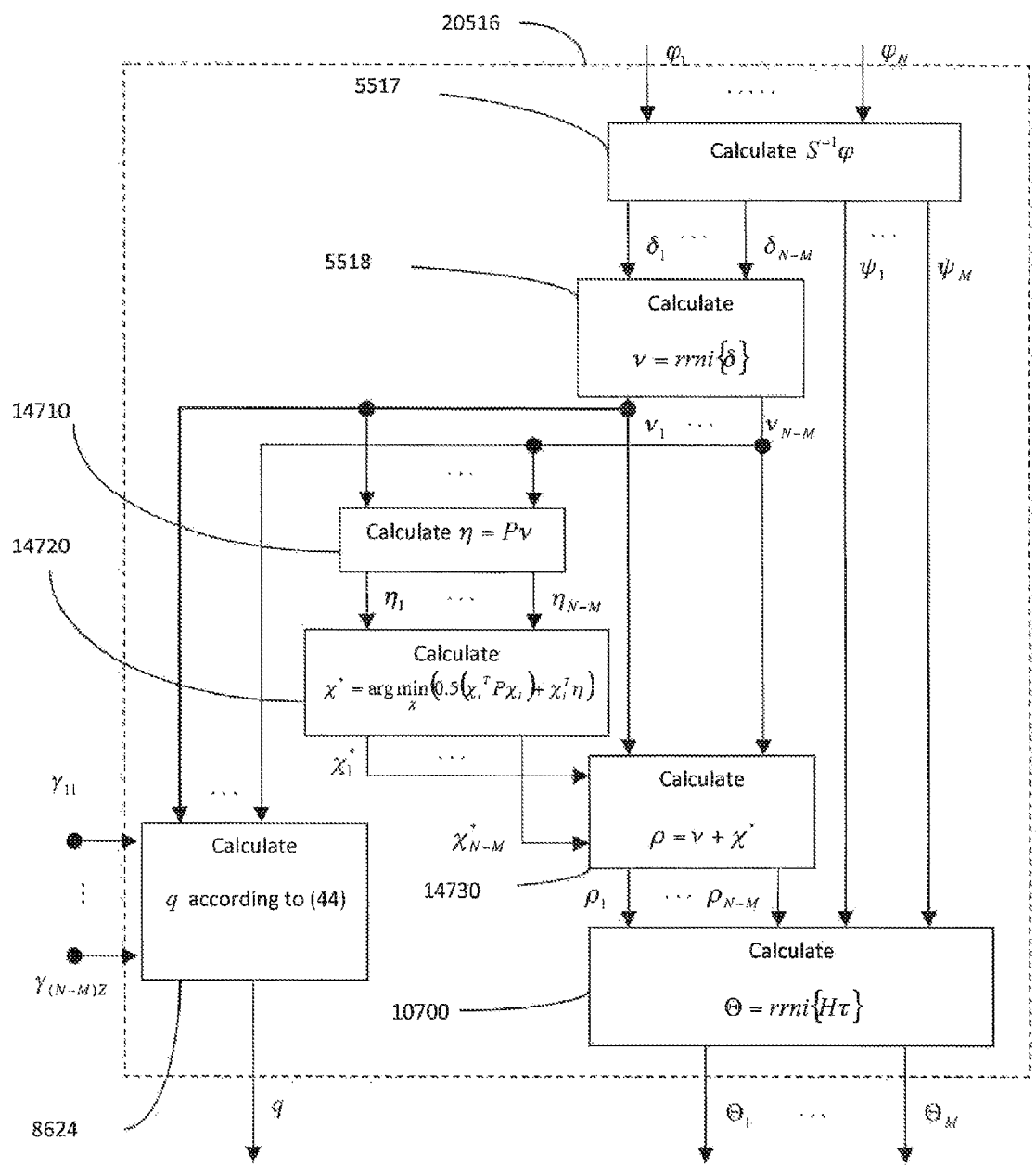
FIG. 20 is a block diagram illustrating various embodiments of a combined estimator.

Reference is next made to FIG. 20, which is a block diagram illustrating various embodiments of combined estimator 20516 that calculates a maximum likelihood estimate of Θ in accordance with equation (52) and discrete noise parameter q according to equation (44). Phase measurements converter module 5517 processes input vector φ and calculates $S^{-1}φ$. Noise parameters calculator module 5518 calculates ν according to equation (40). Noise parameters converter module 14710 calculates η according to equation (51). Voronoi Region shift calculator module 14720 calculates χ* according to equation (50). Noise parameters corrector module 14730 calculates ρ according to equation (54). Second type sought parameters estimator module 10700 calculates Θ according to equation (52). Discrete noise parameter estimator 8624 calculates q according to equation (44). Combined estimator 20516 and discrete noise parameter estimator 8624 have (N−M)*Z inputs of threshold $γ_{ij}$ values. In some embodiments, the magnitudes of those threshold values are set to constant. In various other embodiments, these threshold values can be variable. In various embodiments, the discrete noise parameter q output by discrete noise parameter estimator 8624 and the values of Θ output by second type sought parameters estimator module 10700 are outputs of combined estimator 20516.

Figure 21:
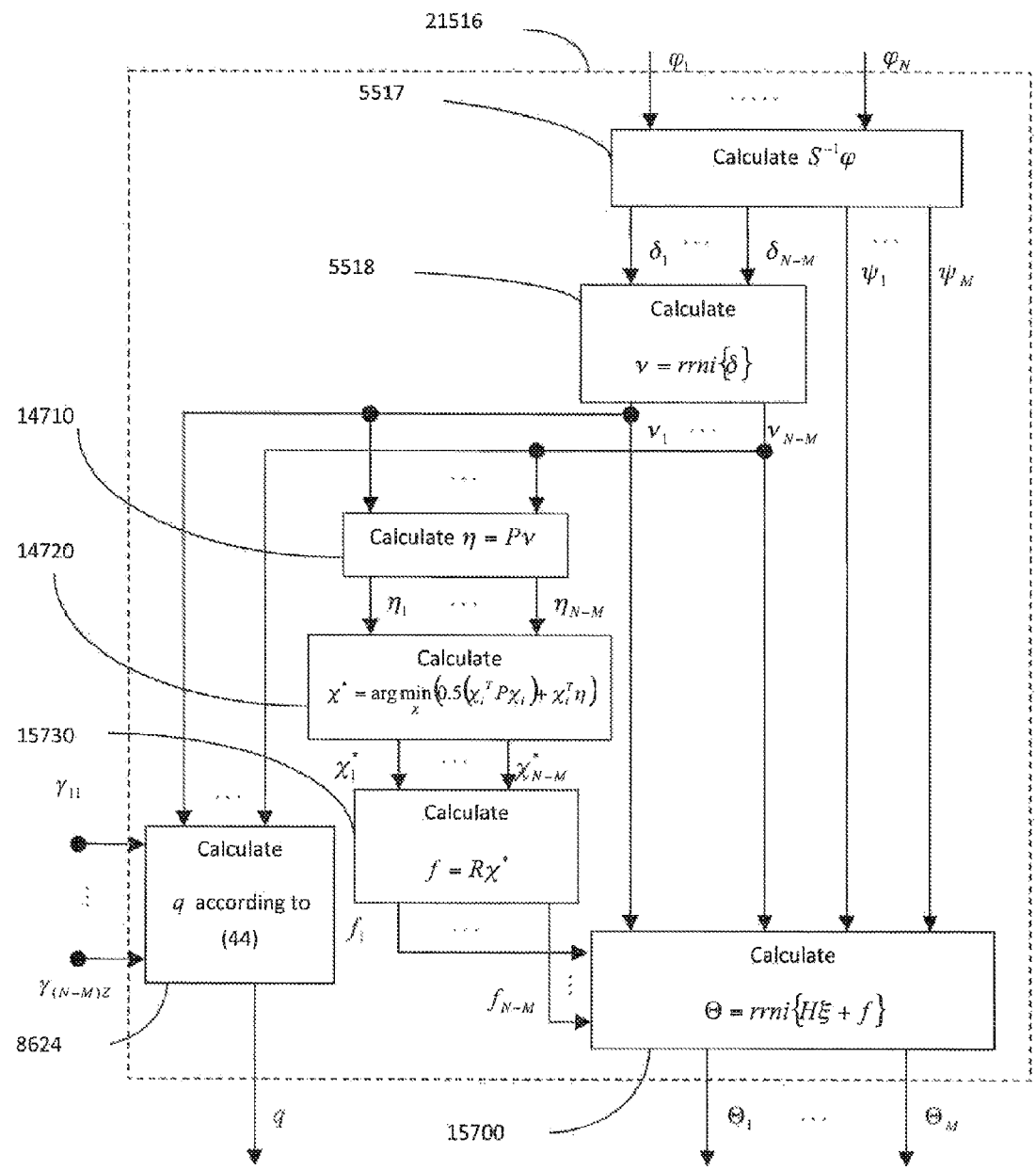
FIG. 21 is a block diagram illustrating various embodiments of a combined estimator.

Reference is now made to FIG. 21, which is a block diagram illustrating various embodiments of combined estimator 21516 that calculates a maximum likelihood estimate of Θ in accordance with equation (55) and discrete noise parameter q according to equation (44). Phase measurements converter module 5517 processes input vector φ and calculates $S^{-1}φ$. Noise parameters calculator module 5518 calculates ν according to equation (40). Noise parameters converter module 14710 calculates η according to equation (51). Voronoi Region shift calculator module 14720 calculates χ* according to equation (50). Second type noise parameters corrector module 15730 calculates f according to (56). Third type sought parameters estimator module 15700 calculates Θ according to equation (55). In various embodiments, discrete noise parameter estimator 8624 calculates q according to equation (44). Combined estimator 21516 and discrete noise parameter estimator 8624 have (N−M)*Z inputs of threshold $γ_{ij}$ values. The magnitudes of those threshold values can be set to constant, or they can be variable. In various embodiments, the discrete noise parameter q output by discrete noise parameter estimator 8624 and the values of Θ output by third type sought parameters estimator module 15700 are outputs of combined estimator 21516.

Reference is again made to FIG. 22, which is a graph that illustrates, in various embodiments, the difference between the probability of correct ambiguity resolution in the calculation of Θ according to equations (52) or (55) without rejection and with rejection on q=1, if only one threshold parallelotope 3313 with $γ_{11}=γ_{21}=0.46$ is considered in the discrete noise parameter estimator 8624. The probability of correct ambiguity resolution has been estimated after 10000 trials in a simulation of the combined estimators 20516 and 21516 for a direction finding interferometer with a planar antenna array with N=4, M=2, and matrix A defined in equation (47). As can be seen from FIG. 22, in various embodiments, the rejection of unreliable Θ samples in a postprocessor (e.g., 2209 in FIG. 2) allows up to 6% increasing the probability of correct ambiguity resolution for the particular conditions listed above.

Some embodiments and some applications may require a high level of Θ accuracy, very high probability of correct ambiguity resolution, and high interferometer throughput. Accordingly, in some embodiments, the combined estimator can work in an adaptive manner to reduce the amount of computation required and thereby also reduce the amount of time required. In particular, in some embodiments, the combined estimator makes a decision regarding the level of noise and which algorithm is most suitable given the level of noise. In some embodiments, the least computationally intensive algorithm or the equation that is most efficient but still applicable given the level of noise is selected. In other embodiments, any of the applicable equations are selected.

For example, in some embodiments, the discrete noise parameter q can be calculated and a determination of position of v with respect to 2 threshold parallelotopes in $\mathfrak{R}^{N-M}$. If v is inside of the smallest parallelotope and if q=0, then Θ can be estimated according to equation (36). However, if v is outside of the smallest parallelotope, but is inside of the second parallelotope and if q=1, then Θ can be estimated according to equation (45). Also, if v is out of the biggest parallelotope and if q=2, then Θ can be estimated according to equation (52) or (55).

Alternatively, assuming a larger number of parallelotopes is defined, if v is inside of a range of the smallest parallelotopes, so that q is below or equal to a first threshold value (i.e., $q \leq T_1$), then Θ can be estimated according to equation (36). However, if v is outside of the range of smallest parallelotopes, but is inside of a range of intermediate parallelotopes, so that q is below or equal to a second threshold value larger than the first threshold value (i.e., $T_1 < q \leq T_2$), then Θ can be estimated according to equation (45). Also, if v is outside of the range of intermediate parallelotopes, so that q is larger than the second threshold value (i.e., $T_2 < q$), then Θ can be estimated according to equation (52) or (55).

Figure 23:
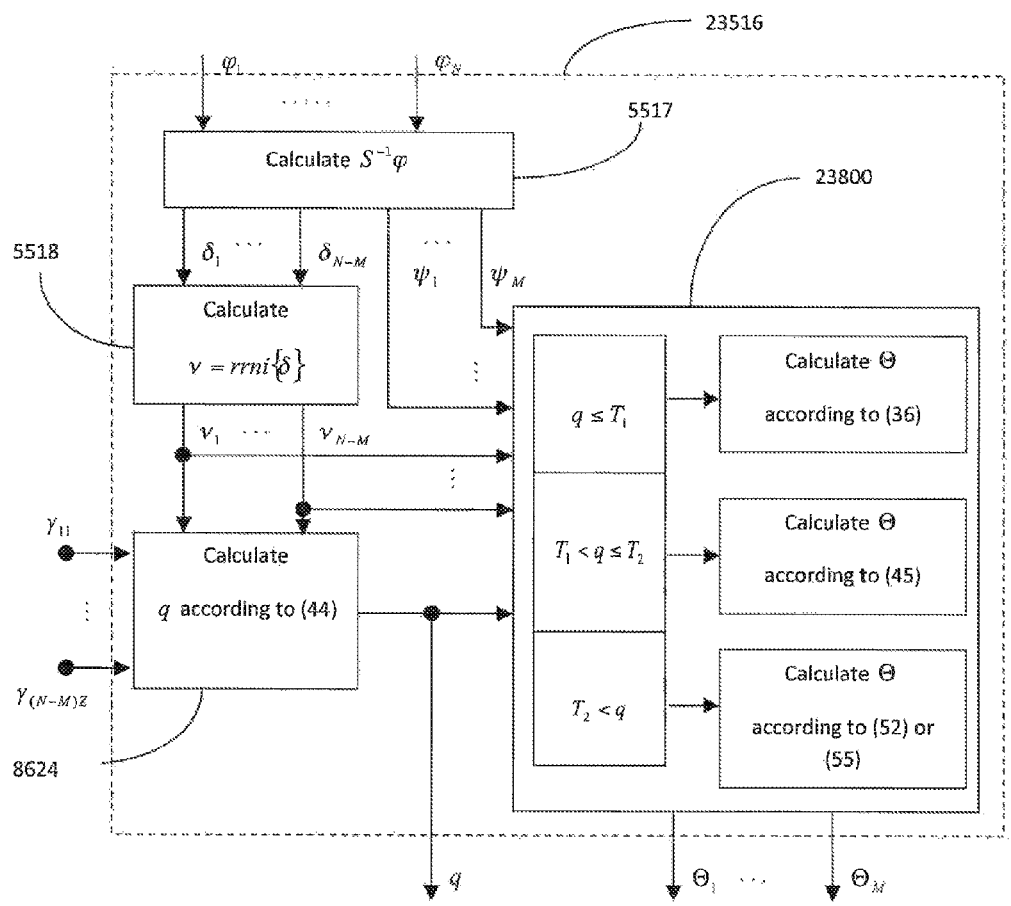
FIG. 23 is a block diagram illustrating various embodiments of a combined estimator.

Reference is now made to FIG. 23, which is a block diagram that illustrates various embodiments of combined estimator 23516 that calculates Θ in different manners depending on the magnitude of discrete noise parameter q. Phase measurements converter module 5517 processes input vector φ and calculates $S^{-1}\phi$. Noise parameters calculator module 5518 calculates v according to equation (40). In various embodiments, discrete noise parameter estimator 8624 calculates q according to equation (44). Adaptive estimator 23800 calculates Θ based on the magnitude of q. If $q \leq T_1$, corresponding to the first range of values, adaptive estimator 23800 calculates Θ according to equation (36). If $T_1 < q \leq T_2$, corresponding to the second range of values larger than the first range, adaptive estimator 23800 calculates Θ according to equation (45). If $T_2 < q$, corresponding to the third range of values larger than the second range, adaptive estimator 23800 calculates Θ according to equation (52) or (55). Combined estimator 23516 and discrete noise parameter estimator 8624 have $(N-M)*Z$ inputs of threshold $\gamma_{ij}$ values. In some embodiments, the magnitudes of those threshold values are set to constant. In various other embodiments, these threshold values can be variable. In various embodiments, the discrete noise parameter q output by discrete noise parameter estimator 8624 and the values of Θ output by adaptive estimator module 23800 are outputs of combined estimator 23516.

The various embodiments of combined estimators described herein can be implemented in hardware, in software running on microprocessor, ASIC, or in combination of hardware and software.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. An interferometer for estimating at least one interferometric parameter of one or more signals from a source, the interferometer comprising:
   at least one phase detector configured to determine a vector φ of N phase measurements of the one or more source signals;
   a combined estimator configured to estimate a vector Θ of M sought parameters representing the at least one interferometric parameter, and at least one noise parameter by processing the vector φ of N phase measurements received from the at least one phase detector, where N is greater than M, each element of the vector φ of N phase measurements is related to the vector Θ of M sought parameters by a vector of N inter numbers k of phase cycles missed in the N phase measurements φ, a vector n of N phase errors associated with the N phase measurements φ, and a matrix A with dimensions N×M comprising M column vectors $\alpha_i$ that are N-dimensional linearly independent vectors of relatively prime numbers; and
   a postprocessor configured to process estimates of the vector Θ of M sought parameters based on the at least one noise parameter received from the combined estimator to improve an estimate of the at least one interferometric parameter.

2. The interferometer of claim 1, wherein the vector φ of phase measurements is related to the vector of sought parameters Θ according to:

$$\phi = A\Theta - k + n.$$

3. The interferometer of claim 2, wherein the combined estimator comprises:
   a phase measurements converter configured to calculate an M-dimensional vector ψ by processing the vector φ of phase measurements received from the at least one phase detector according to:

$$\psi = V\phi,$$

where V is a matrix with dimensions M×N that is predefined for the matrix A, and to calculate an (N−M) dimensional vector δ by processing the vector φ of phase measurements received from the at least one phase detector according to:

$$\delta = U\phi,$$

where U is a matrix with dimensions M×N that is predefined for the matrix A; and
   a noise parameters calculator configured to process the vector δ received from the phase measurements converter to calculate an (N−M) dimensional vector v of noise parameters according to: vector v of noise parameters according to:

$$v = \text{rrni}\{\delta\},$$

where rrni{...} is a procedure for calculating residuals of rounding each element of the vector inside the braces {...} to nearest integers.

4. The interferometer of claim 3, wherein the combined estimator further comprises a sought parameters estimator configured to determine the vector Θ of sought parameters by processing the vector ψ received from the phase measurements converter according to:

$$\Theta = \text{rrni}\{\psi\},$$

wherein the vector Θ of sought parameters and the at least one noise parameter are outputs of the combined estimator.

5. The interferometer of claim 4, wherein the vector v of noise parameters is an output of the combined estimator.

6. The interferometer of claim 4, wherein the combined estimator further comprises a common noise parameter estimator configured to calculate a common noise parameter α according to:

$$\alpha = \left(\sum_{i=1}^{N-M} v_i^2\right)^{1/2},$$

where each $v_i$ is an element of the vector v of noise parameters received from the noise parameters calculator, and wherein the common noise parameter α is an output of the combined estimator.

7. The interferometer of claim 4, wherein the combined estimator further comprises a discrete noise parameter estimator having the vector v of noise parameters received from the noise parameters calculator and (N−M)×Z threshold values $\gamma_{ij}$ as inputs, the discrete noise parameter estimator configured to calculate:

$$\beta_{ij} = \begin{cases} 1, & |v_i| \geq \gamma_{ij} \\ 0, & |v_i| < \gamma_{ij}; \end{cases}$$
$$i = 1, \ldots (N-M),\ j = 1, \ldots Z,$$

where $|v_i|$ is an absolute value of $v_i$, and wherein the discrete noise parameter estimator is configured to calculate Z elements of a vector ϵ according to:

$$\epsilon_j = (\beta_{1j} v \beta_{2j} v \ldots v \beta_{(N-M)j});\ j=1, \ldots Z,$$

where V is a logical disjunction, and wherein the discrete noise parameter estimator is configured to calculate a discrete noise parameter q according to $$q = \text{count}[\epsilon],$$

where count[ . . . ] is a procedure for counting a number of logical ones in the binary vector inside the square brackets, and wherein the discrete noise parameter q is an output of the combined estimator.

8. The interferometer of claim 3, wherein the combined estimator further comprises a sought parameters estimator configured to determine the vector Θ of sought parameters according to:

$$\Theta = \text{rmi}\{H\xi\},$$

where H is a matrix with dimensions M×N that is predefined for the matrix A and for a covariance matrix B that characterizes the vector n of phase errors, and ξ is an N-dimensional vector combination of the vector v of noise parameters received from the noise parameters calculator, and the vector ψ received from the phase measurements converter, according to:

$$\xi = \begin{pmatrix} v \\ \psi \end{pmatrix},$$

wherein the vector Θ of sought parameters and the at least one noise parameter are outputs of the combined estimator.

9. The interferometer of claim 8, wherein the vector v of noise parameters is an output of the combined estimator.

10. The interferometer of claim 8, wherein the combined estimator further comprises a common noise parameter estimator configured to calculate a common noise parameter a: according to $$\alpha = \left(\sum_{i=1}^{N-M} v_i^2\right)^{1/2},$$

where each $v_i$ is an element of the vector v of noise parameters received from the noise parameters calculator, and wherein the common noise parameter α is an output of the combined estimator.

11. The interferometer of claim 8, wherein the combined estimator further comprises a discrete noise parameter estimator having the vector v of noise parameters received from the noise parameters calculator and (N−M)×Z threshold values $\gamma_{ij}$ as inputs, the discrete noise parameter estimator configured to calculate:

$$\beta_{ij} = \begin{cases} 1, & |v_i| \geq \gamma_{ij} \\ 0, & |v_i| < \gamma_{ij}; \end{cases}$$
$$i = 1, \ldots (N-M),\ j = 1, \ldots Z,$$

where $|v_i|$ is an absolute value of $v_i$, and wherein the discrete noise parameter estimator is configured to calculate Z elements of a vector ϵ according to:

$$\epsilon_j = (\beta_{1j} v \beta_{2j} v \ldots v \beta_{(N-M)j});\ j=1, \ldots Z,$$

where V is a logical disjunction, and wherein the discrete noise parameter estimator is configured to calculate a discrete noise parameter q according to:

$$q = \text{count}[\epsilon],$$

where count[ . . . ] is a procedure for counting a number of logical ones in the binary vector inside the square brackets, and wherein the discrete noise parameter q is an output of the combined estimator.

12. The interferometer of claim 3, wherein the combined estimator further comprises:

a noise parameters converter configured to process the vector v of noise parameters received from the noise parameters calculator to calculate an (N−M)-dimensional vector η according to:

$$\eta = Pv,$$

where P is a matrix with dimensions (N−M)×(N−M) that is predefined for the matrix A and for a covariance matrix B that characterizes the vector n of phase errors;

a region shift calculator configured to process the vector r received from the noise parameters converter to calculate an (N−M)-dimensional vector 102 * according to:

$$\chi^* = \underset{\chi}{\text{argmin}}(0.5(\chi_i^T P \chi_i) + \chi_i^T \eta),$$

where each $\chi_i$ is an (N−M)-dimensional vector comprising elements of 0 or ±1 that is predefined for the matrix A and for the covariance matrix B;

a noise parameters corrector configured to process the vector v of noise parameters received from the noise parameters calculator and the vector χ* received from the region shift calculator to calculate an (N−M)-dimensional vector ρ according to:

$$\rho = v + \chi^*;\ \text{and}$$

a sought parameters estimator configured to calculate the vector Θ of sought parameters according to:

$$\Theta = \text{rrni}\{H\tau\},$$

where H is a matrix with dimensions M×N that is predefined for the matrix A and for the covariance matrix B, and τ is an N-dimensional vector combination of the vector ρ received from the noise parameters corrector, and the vector ψ received from the phase measurements converter, according to $$\tau = \begin{pmatrix} \rho \\ \psi \end{pmatrix},$$

wherein the vector Θ of sought parameters and the at least one noise parameter are outputs of the combined estimator.

13. The interferometer of claim 12, wherein the vector v of noise parameters is an output of the combined estimator.

14. The interferometer of claim 12, wherein the combined estimator further comprises a common noise parameter estimator configured to calculate a common noise parameter α according to $$\alpha = \left( \sum_{i=1}^{N-M} v_i^2 \right)^{1/2},$$

where each $v_i$ is an element of the vector v of noise parameters received from the noise parameters calculator, and wherein the common noise parameter α is an output of the combined estimator.

15. The interferometer of claim 12, wherein the combined estimator further comprises a discrete noise parameter estimator having the vector v of noise parameters received from the noise parameters calculator and (N−M)×Z threshold values $\gamma_{ij}$ as inputs, the discrete noise parameter estimator configured to calculate:

$$\beta_{ij} = \begin{cases} 1, & |v_i| \geq \gamma_{ij} \\ 0, & |v_i| < \gamma_{ij} \end{cases}; i = 1, \ldots (N-M), j = 1, \ldots Z,$$

where $|v_i|$ is an absolute value of $v_i$, and wherein the discrete noise parameter estimator is configured to calculate Z elements of a vector ε according to:

$$\epsilon_j = (\beta_{1j} \vee \beta_{2j} \vee \ldots \vee \beta_{(N-M)j}); j = 1, \ldots Z,$$

where V is a logical disjunction, and wherein the discrete noise parameter estimator is configured to calculate a discrete noise parameter q according to:

$$q = \text{count}[\epsilon],$$

where count[. . . ] is a procedure for counting a number of logical ones in the binary vector inside the square brackets, and wherein the discrete noise parameter q is an output of the combined estimator.

16. The interferometer of claim 3, wherein the combined estimator further comprises:
a noise parameters converter configured to process the vector v of noise parameters received from the noise parameters calculator to calculate an (N−M)-dimensional vector η according to:

$$\eta = Pv,$$

where P is a matrix with dimensions (N−M)×(N−M) that is predefined for the matrix A and for a covariance matrix B that characterizes the vector n of phase errors;
a region shift calculator configured to process the vector η received from the noise parameters converter to calculate an (N−M)-dimensional vector χ* according to:

$$\chi^* = \operatorname*{argmin}_\chi (0.5(\chi_i^T P \chi_i) + \chi_i^T \eta),$$

where each $\chi_i$ is an (N−M)-dimensional vector comprising elements of 0 or ±1 that is predefined for the matrix A and for the covariance matrix B;
a noise parameters corrector configured to process the vector χ* received from the region shift calculator to calculate an M-dimensional vector f according to:

$$f = R\chi^*,$$

where R is a matrix with dimensions M×(N−M) that is predefined for the matrix A and for the covariance matrix B; and
a sought parameters calculator configured to calculate the vector Θ of sought parameters by processing the vector f received from the noise parameters corrector according to:

$$\Theta = \text{rrni}\{H\xi + f\},$$

where H is a matrix with dimensions M×N that is predefined for the matrix A and for the covariance matrix B, and ξ is an N-dimensional vector combination of the vector v of noise parameters received from the noise parameters calculator, and the vector ψ received from the phase measurements converter, according to:

$$\xi = \begin{pmatrix} v \\ \psi \end{pmatrix},$$

wherein the vector Θ of sought parameters and the at least one noise parameter are outputs of the combined estimator.

17. The interferometer of claim 16, wherein the vector v of noise parameters is an output of the combined estimator.

18. The interferometer of claim 16, wherein the combined estimator further comprises a common noise parameter estimator configured to calculate a common noise parameter α according to:

$$\alpha = \left( \sum_{i=1}^{N-M} v_i^2 \right)^{1/2},$$

where each $v_i$ is an element of the vector v of noise parameters received from the noise parameters calculator, and wherein the common noise parameter α is an output of the combined estimator.

19. The interferometer of claim 16, wherein the combined estimator further comprises a discrete noise parameter estimator having the vector v of noise parameters received from the noise parameters calculator and (N−M)×Z threshold values $\gamma_{ij}$ as inputs, the discrete noise parameter estimator configured to calculate:

$$\beta_{ij} = \begin{cases} 1, & |v_i| \geq \gamma_{ij} \\ 0, & |v_i| < \gamma_{ij} \end{cases}; i = 1, \ldots (N-M), j = 1, \ldots Z,$$

where $|v_i|$ is an absolute value of $v_i$, and wherein the discrete noise parameter estimator is configured to calculate Z elements of a vector $\epsilon$ according to:

$$\epsilon_j = (\beta_{1j} \vee \beta_{2j} \vee \ldots \vee \beta_{(N-M)j}); j=1, \ldots Z,$$

where V is a logical disjunction, and wherein the discrete noise parameter estimator is configured to calculate a discrete noise parameter q according to:

q=count[$\epsilon$], where count[ . . . ] is a procedure for counting a number of logical ones in the binary vector inside the square brackets, and wherein the discrete noise parameter q is an output of the combined estimator.

20. The interferometer of claim 3, wherein the combined estimator further comprises:
a discrete noise parameter estimator having the vector v of noise parameters received from the noise parameters calculator and (N−M)×Z threshold values $\gamma_{ij}$ as inputs, the discrete noise parameter estimator configured to calculate:

$$\beta_{ij} = \begin{cases} 1, & |v_i| \geq \gamma_{ij} \\ 0, & |v_i| < \gamma_{ij} \end{cases}; i = 1, \ldots (N-M), j = 1, \ldots Z,$$

where $|v|$ is an absolute value of $v_i$, and wherein the discrete noise parameter estimator is configured to calculate Z elements of a vector $\epsilon$ according to:

$$\epsilon_j = (\beta_{1j} \vee \beta_{2j} \vee \ldots \vee \beta_{(N-M)j}); j=1, \ldots Z,$$

where V is a logical disjunction, and wherein the discrete noise parameter estimator is configured to calculate a discrete noise parameter q according to:

q=count[$\epsilon$], where count[ . . . ] is a procedure for counting a number of logical ones in the binary vector inside the square brackets; and
an adaptive estimator having the discrete noise parameter q received from the discrete noise parameter estimator, the vector v of noise parameters received from the noise parameters calculator, and the vector ψ received from the phase measurements converter as inputs, the adaptive estimator configured to determine the vector Θ of sought parameters differently based upon the value of the discrete noise parameter q.

21. The interferometer of claim 20, wherein the adaptive estimator is configured to determine the vector Θ of sought parameters:
if q is below or equal to a first threshold, according to:

Θ=rrni{ψ};

if q is above the first threshold and below or equal to a second threshold greater than the first threshold, according to:

Θ=rrni{Hξ}, where H is a matrix with dimensions M×N that is predefined for the matrix A and for a covariance matrix B that characterizes the vector n of phase errors, and ξ is an N-dimensional vector combination of v and ψ according to $$\xi = \begin{pmatrix} v \\ \psi \end{pmatrix};$$

and
if q is above the second threshold, by calculating an (N−M)-dimensional vector η according to:

η=Pv, where P is a matrix with dimensions (N−M)×(N−M) that is predefined for the matrix A and for the covariance matrix B, and by further calculating an (N−M)-dimensional vector χ* according to:

$$\chi^* = \underset{\chi}{\mathrm{argmin}}(0.5(\chi_i^T P \chi_i) + \chi_i^T \eta),$$

where each $\chi_i$ is an (N−M)-dimensional vector comprising elements of 0 or ±1 that is predefined for the matrix A and for the covariance matrix B, and by further calculating an (N−M)-dimensional vector ρ according to:

ρ=v+χ*, and by calculating the vector Θ of sought parameters according to:

Θ=rrni{Hτ}, where τ is an N-dimensional vector combination of ρ and ψ according to:

$$\tau = \begin{pmatrix} \rho \\ \psi \end{pmatrix},$$

wherein the vector Θ of sought parameters and the discrete noise parameter q are outputs of the combined estimator.

22. The interferometer of claim 20, wherein the adaptive estimator is configured to determine the vector Θ of sought parameters,
if q is below or equal to a first threshold, according to:

Θ=rrni{ψ};

if q is above the first threshold and below or equal to a second threshold greater than the first threshold, according to:

Θ=rrni{Hξ+f}, where H is a matrix with dimensions M×N that is predefined for the matrix A and for a covariance matrix B that characterizes the vector n of phase errors, and ξ is an N-dimensional vector combination of v and ψ according to:

$$\xi = \begin{pmatrix} v \\ \psi \end{pmatrix};$$

and
if q is above the second threshold, by calculating an (N−M)-dimensional vector η according to:

η=Pv, where P is a matrix with dimensions (N−M)×(N−M) that is predefined for the matrix A and for the covariance matrix B, and by further calculating an (N−M)-dimensional vector χ* according to $$\chi^* = \underset{\chi}{\operatorname{argmin}}(0.5(\chi_i^T P \chi_i) + \chi_i^T \eta),$$

where each $\chi_i$ is an (N−M)-dimensional vector comprising elements of 0 or ±1 that is predefined for the matrix A and for the covariance matrix B, and by further calculating an M-dimensional vector f according to:

$$f = P v,$$

where R is a matrix with dimensions M×(N−M) that is predefined for the matrix A and for the covariance matrix B, and by calculating the vector Θ of sought parameters according to:

$$\Theta = \operatorname{rrni}\{H\xi + f\},$$

wherein the vector Θ of sought parameters and the discrete noise parameter q are outputs of the combined estimator.

23. The interferometer of claim 1, wherein the postprocessor is configured to:
  determine if the estimate of the at least one noise parameter is below a threshold noise level; and
  process estimates of the at least one element of the vector Θ of M sought parameters generated based on the vector φ of N phase measurements for which the estimate of at least one noise parameter is determined to be below the threshold noise level.

24. The interferometer of claim 1, further comprising:
  an antenna array for receiving the one or more signals, the antenna array comprising N+1 antennas;
  N+1 receivers coupled to the N+1 antennas, each of the N+1 receivers coupled to a corresponding one of the N+1 antennas; and
  N phase detectors coupled between N pairs of receivers for providing the N phase measurements.

25. A combined estimator for use in an interferometer, the combined estimator comprising a processor configured to:
  receive a vector φ of N phase measurements; and
  estimate a vector Θ of M sought parameters and at least one noise parameter by processing the vector φ of phase measurements, where N is greater than M, each element of the vector φ of phase measurements defined within one phase cycle, and the vector φ of phase measurements related to the vector Θ of sought parameters by: a vector of N integer numbers k of phase cycles missed in the N phase measurements φ, a vector n of N phase errors associated with the N phase measurements φ, and a matrix A with dimensions N×M comprising M column vectors $\alpha_i$, that are N-dimensional linearly independent vectors of relatively prime numbers, the relation defined according to:

$$\phi = A\Theta - k + n,$$

wherein the combined estimator is configured to produce a maximum likelihood estimate of the vector Θ of sought parameters using at least one noise parameter calculated by the combined estimator based upon the vector φ of phase measurements.

26. The combined estimator of claim 25, further comprising:
  a phase measurements converter configured to calculate an M dimensional vector ψ by processing the vector φ of phase measurements received into the combined estimator according to:

$$\psi = V\phi,$$

where V is a matrix with dimensions M×N that is predefined for the matrix A, and to calculate an (N−M) dimensional vector δ by processing the vector φ of phase measurements received into the combined estimator according to:

$$\delta = U\phi,$$

where U is a matrix with dimensions (N−M)×N that is predefined for the matrix A;
  a noise parameters calculator configured to process the vector δ received from the phase measurements converter to calculate an (N−M) dimensional vector ν of noise parameters according to:

$$\nu = \operatorname{rrni}\{\delta\},$$

where rrni{ . . . } is a procedure for calculating residuals of rounding each element of the vector inside the braces{ . . . } to nearest integers;
  a noise parameters converter configured to process the vector ν of noise parameters received from the noise parameters calculator to calculate an (N−M)-dimensional vector η according to:

$$\eta = P\nu,$$

where P is a matrix with dimensions (N−M)×(N−M) that is predefined for the matrix A and for a covariance matrix B that characterizes the vector n of phase errors; and
  a region shift calculator configured to process the vector η received from the noise parameters converter to calculate an (N−M)-dimensional vector χ* according to:

$$\chi^* = \underset{\chi}{\operatorname{argmin}}(0.5(\chi_i^T P \chi_i) + \chi_i^T \eta),$$

wherein each $\chi_i$ is an (N−M)-dimensional vector comprising elements of 0 or ±1 that is predefined for the matrix A and for the covariance matrix B, and the combined estimator is configured to produce the maximum likelihood estimate of the vector Θ of sought parameters using the vector χ* calculated by the region shift calculator.

27. The combined estimator of claim 26, further comprising:
  a noise parameters corrector configured to process the vector ν of noise parameters received from the noise parameters calculator and the vector χ* received from the region shift calculator to calculate an (N−M)-dimensional vector ρ according to:

$$\rho = \nu + \chi^*; \text{ and}$$

a sought parameters estimator configured to produce the maximum likelihood estimate of the vector Θ of sought parameters according to:

$$\Theta = \operatorname{rrni}\{H\tau\},$$

where H is a matrix with dimensions M×N that is predefined for the matrix A and for the covariance matrix B, and τ is an N-dimensional vector combination of the vector ρ received from the noise parameters corrector, and the vector ψ received from the phase measurements converter according to $$\tau = \begin{pmatrix} \rho \\ \psi \end{pmatrix};$$

wherein the vector Θ of sought parameters is an output of the combined estimator.

28. The combined estimator of claim 26, further comprising:
   a noise parameters corrector configured to process the vector χ* received from the region shift calculator to calculate an M-dimensional vector f according to:

$f = R\chi^*$, where R is a matrix with dimensions M×(N−M) that is predefined for the matrix A and for the covariance matrix B; and
   a sought parameters calculator configured to produce the maximum likelihood estimate of the vector Θ of sought parameters by processing the vector f received from the noise parameters corrector according to:

Θ=rrni{Hξ+f}, where H is a matrix with dimensions M×N that is predefined for the matrix A and for the covariance matrix B, and ξ is an N-dimensional vector combination of the vector ν of noise parameters received from the noise parameters calculator, and the vector ψ received from the phase measurements converter, according to:

$$\xi = \begin{pmatrix} \nu \\ \psi \end{pmatrix};$$

and
   wherein the vector Θ of sought parameters is an output of the combined estimator.

29. A combined estimator for use in an interferometer, the combined estimator comprising a processor configured to:
   receive a vector φ of N phase measurements; and
   estimate a vector Θ of M sought parameters and at least one noise parameter by processing the vector φ of phase measurements, where N is greater than M, each element of the vector φ of phase measurements defined within one phase cycle, and the vector φ of phase measurements related to the vector Θ of sought parameters by: a vector of N integer numbers k of phase cycles missed in the N phase measurements φ, a vector n of N phase errors associated with the N phase measurements φ, and a matrix A with dimensions N×M comprising M column vectors $\alpha_i$ that are N-dimensional linearly independent vectors of relatively prime numbers; wherein the vector Θ of sought parameters and the at least one noise parameter are output by the combined estimator for processing in a postprocessor using the at least one noise parameter as a quality factor to improve the estimate of the M sought parameters.

30. A method of estimating at least one interferometric parameter of one or more signals from a source, the method comprising:
   measuring a vector φ of N phase measurements of the one or more source signals by at least one phase detector;
   estimating, by a combined estimator, a vector Θ of M sought parameters representing the at least one interferometric parameter, and at least one noise parameter by processing the vector φ of N phase measurements received from the at least one phase detector, where N is greater than M, each element of the vector φ of N hase measurements is related to the vector Θ of M sought parameters by: a vector of N integer numbers k of phase cycles missed in the N phase measurements φ, a vector n of N phase errors associated with the N phase measurements φ, and a matrix A with dimensions N×M comprising M column vectors $\alpha_i$ that are N-dimensional linearly independent vectors of relativel rime numbers; and
   processing, by a postprocessor estimates of the vector Θ of M sought parameters based on the at least one noise parameter received from the combined estimator to improve an estimate of the at least one interferometric parameter.

31. A method of estimating at least one interferometric parameter of one or more signals from a source, the method comprising:
   measuring a vector φ of N phase measurements of the one or more source signals by at least one phase detector;
   processing the vector φ of N phase measurements by a combined estimator to estimate at least one noise parameter associated with the plurality of phase measurements;
   comparing, by a postprocessor the at least one noise parameter to a threshold noise level; and
   based on a result of the comparison, processing the vector φ of N phase measurements by the postprocessor to estimate a vector Θ of M sought parameters representing the at least one interferometric parameter, where N is greater than M, each element of the vector φ of N phase measurements is related to the vector Θ of M sought parameters by: a vector of er numbers k of phase cycles missed in the N phase measurements φ, a vector n of N phase errors associated with the N phase measurements φ, and a matrix A with dimensions N×M comprising M column vectors $\alpha_i$ that are N-dimensional linearly independent vectors of relatively prime numbers.

\* \* \* \* \*